(12) United States Patent
Robbins et al.

(10) Patent No.: US 12,001,088 B2
(45) Date of Patent: Jun. 4, 2024

(54) OPTICAL ELEMENTS FOR INTEGRATED IR AND VISIBLE CAMERA FOR DEPTH SENSING AND SYSTEMS INCORPORATING THE SAME

(71) Applicant: Meta Platforms Technologies, LLC, Menlo Park, CA (US)

(72) Inventors: Steven John Robbins, Redmond, WA (US); Michael James Escuti, Raleigh, NC (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 478 days.

(21) Appl. No.: 17/174,714

(22) Filed: Feb. 12, 2021

(65) Prior Publication Data

US 2021/0247632 A1 Aug. 12, 2021

Related U.S. Application Data

(60) Provisional application No. 62/975,692, filed on Feb. 12, 2020, provisional application No. 62/975,685, filed on Feb. 12, 2020.

(51) Int. Cl.
*G02F 1/01* (2006.01)
*G02F 1/1335* (2006.01)
(Continued)

(52) U.S. Cl.
CPC ...... *G02F 1/0136* (2013.01); *G02F 1/133504* (2013.01); *G02F 1/133536* (2013.01);
(Continued)

(58) Field of Classification Search
CPC ............. G02F 1/0136; G02F 1/133504; G02F 1/133536; G02F 1/137; G02F 2203/01;
(Continued)

(56) References Cited

U.S. PATENT DOCUMENTS 3,848,129 A 11/1974 Figler et al.
5,808,350 A 9/1998 Jack et al.
(Continued)

FOREIGN PATENT DOCUMENTS

AU 2002320622 A2 3/2003
CN 111812615 A 10/2020
(Continued)

OTHER PUBLICATIONS

Office Action dated Dec. 12, 2023 for Japanese Patent Application No. 2022-548797, filed on Feb. 12, 2021, 3 pages.
(Continued)

*Primary Examiner* — Alexander P Gross
*Assistant Examiner* — William D Peterson
(74) *Attorney, Agent, or Firm* — Weaver Austin Villeneuve & Sampson LLP

(57) ABSTRACT

A multi-spectral optical imaging device includes a switchable element configured to be switched between first and second states, one of which alters a polarization of light, and a geometric phase element arranged to receive the light from the switchable element. The geometric phase element is configured to diffract a first wavelength band of the light to alter a direction of propagation thereof based on the polarization and without substantially altering a direction of propagation of a second wavelength band of the light, responsive to the first state of the switchable element. Related optical shutters and multi-spectral optical detectors are also discussed.

36 Claims, 10 Drawing Sheets

(51) Int. Cl.
*G02F 1/137* (2006.01)
*H04N 23/11* (2023.01)

(52) U.S. Cl.
CPC ............ *G02F 1/137* (2013.01); *H04N 23/11* (2023.01); *G02F 2203/01* (2013.01); *G02F 2203/07* (2013.01); *G02F 2203/11* (2013.01)

(58) Field of Classification Search
CPC .. G02F 2203/07; G02F 2203/11; H04N 23/11
USPC ....................................................... 348/164
See application file for complete search history.

(56) References Cited

U.S. PATENT DOCUMENTS

| | | | |
|---|---|---|---|
| 5,892,612 | A | 4/1999 | Miller et al. |
| 6,266,113 | B1 | 7/2001 | Yamazaki et al. |
| 6,559,903 | B2 | 5/2003 | Faris et al. |
| 6,664,529 | B2 | 12/2003 | Pack et al. |
| 7,154,157 | B2 | 12/2006 | Bradski et al. |
| 7,459,686 | B2 | 12/2008 | Syllaios et al. |
| 7,483,151 | B2 | 1/2009 | Zganec et al. |
| 7,551,059 | B2 | 6/2009 | Farrier |
| 7,566,855 | B2 | 7/2009 | Olsen et al. |
| 7,714,262 | B2 | 5/2010 | Olsen et al. |
| 7,915,652 | B2 | 3/2011 | Lee et al. |
| 8,134,637 | B2 | 3/2012 | Rossbach et al. |
| 8,537,310 | B2 | 9/2013 | Escuti et al. |
| 8,865,507 | B2 | 10/2014 | Haddad et al. |
| 8,982,313 | B2 | 3/2015 | Escuti et al. |
| 9,195,092 | B2 | 11/2015 | Escuti et al. |
| 10,324,170 | B1 | 6/2019 | Engberg et al. |
| 10,466,043 | B2 | 11/2019 | Konolige |
| 10,477,173 | B1 | 11/2019 | Ortiz Egea et al. |
| 10,705,214 | B2 | 7/2020 | Akkaya et al. |
| 10,859,740 | B2 | 12/2020 | Escuti et al. |
| 11,435,641 | B1 * | 9/2022 | Jamali .................. G02F 1/13306 |
| 2002/0118328 | A1 | 8/2002 | Faris et al. |
| 2003/0098918 | A1 | 5/2003 | Miller |
| 2004/0095531 | A1 | 5/2004 | Jiang et al. |
| 2004/0263732 | A1 * | 12/2004 | Jurg .................... G02F 1/13473 349/119 |
| 2010/0073753 | A1 | 3/2010 | Kimura |
| 2012/0188467 | A1 | 7/2012 | Escuti et al. |
| 2012/0188472 | A1 | 7/2012 | Sheng |
| 2013/0335683 | A1 | 12/2013 | Escuti et al. |
| 2015/0256767 | A1 | 9/2015 | Schlechter |
| 2016/0330360 | A1 | 11/2016 | Powell et al. |
| 2017/0248811 | A1 * | 8/2017 | Clemen, Jr. ........... B64C 1/1484 |
| 2017/0373459 | A1 | 12/2017 | Weng et al. |
| 2018/0146186 | A1 | 5/2018 | Akkaya et al. |
| 2019/0163013 | A1 | 5/2019 | Cammenga et al. |
| 2019/0306386 | A1 * | 10/2019 | Akkaya ............... G02F 1/13473 |
| 2019/0385321 | A1 | 12/2019 | Akkaya et al. |
| 2020/0232787 | A1 | 7/2020 | Wang |

FOREIGN PATENT DOCUMENTS

| | | |
|---|---|---|
| JP | 2008067218 A | 3/2008 |
| JP | 2010072437 A | 4/2010 |
| JP | 2011017827 A | 1/2011 |
| JP | 2016153795 A | 8/2016 |
| JP | 2017074177 A | 4/2017 |
| TW | I513273 B | 12/2015 |
| WO | 02082692 A1 | 10/2002 |
| WO | 2007043036 A1 | 4/2007 |
| WO | WO-2012067080 A1 | 5/2012 |
| WO | 2016097409 A3 | 8/2016 |
| WO | 2017139143 A1 | 8/2017 |

OTHER PUBLICATIONS

Kim et al. "Nonmechanical Laser Beam Steering Based on Polymer Polarization Gratings: Design Optimization and Demonstration" Journal of Lightwave Technology 33(10): 2068-2077 (May 15, 2015).
Komanduri et al. "A High Throughput Liquid Crystal Light Shutter for Unpolarized Light using Polymer Polarization Gratings" Proceedings vol. 8052, Acquisition, Tracking, Pointing, and Laser Systems Technologies XXV; 80520R (2011).
Lee et al. "Reflective polarization volume gratings for high efficiency waveguide-coupling augmented reality displays" Optics Express 25(22):27008-7 (2017).
Xiang et al. "Bragg polarization gratings for wide angular bandwidth and high efficiency at steep deflection angles" Scientific Reports 8:7202 (2018).
Xiang et al. "Nanoscale liquid crystal polymer Bragg polarization gratings" Optics Express 25(16):19298-11 (2017).
Xiang et al. "Numerical analysis of Bragg polarization gratings" JOSA B 36(5):D1-8 (2019).
International Preliminary Report on Patentability for International Application No. PCT/US2021/017808, dated Aug. 25, 2022, 9 pages.
Notification of Transmittal of the International Search Report and the Written Opinion of the International Searching Authority, or the Declaration, in corresponding PCT Application No. PCT/US2021/017808 (dated Jun. 3, 2021).
Kim J., et al., "Snapshot Imaging Spectropolarimeter Utilizing Polarization Gratings," Proceedings of SPIE, 2008, vol. 7086, pp. 708603-1-708603-10.
Komanduri R.K., et al., "34.4: Late-News Paper: Polarization-independent Projection Systems using Thin Film Polymer Polarization Gratings and Standard Liquid Crystal Microdisplays," SID 09 Digest, 2009, pp. 487-490.
Supplementary European Search Report for European Patent Application No. 21754685.2, mailed Feb. 14, 2024, 14 pages.

* cited by examiner

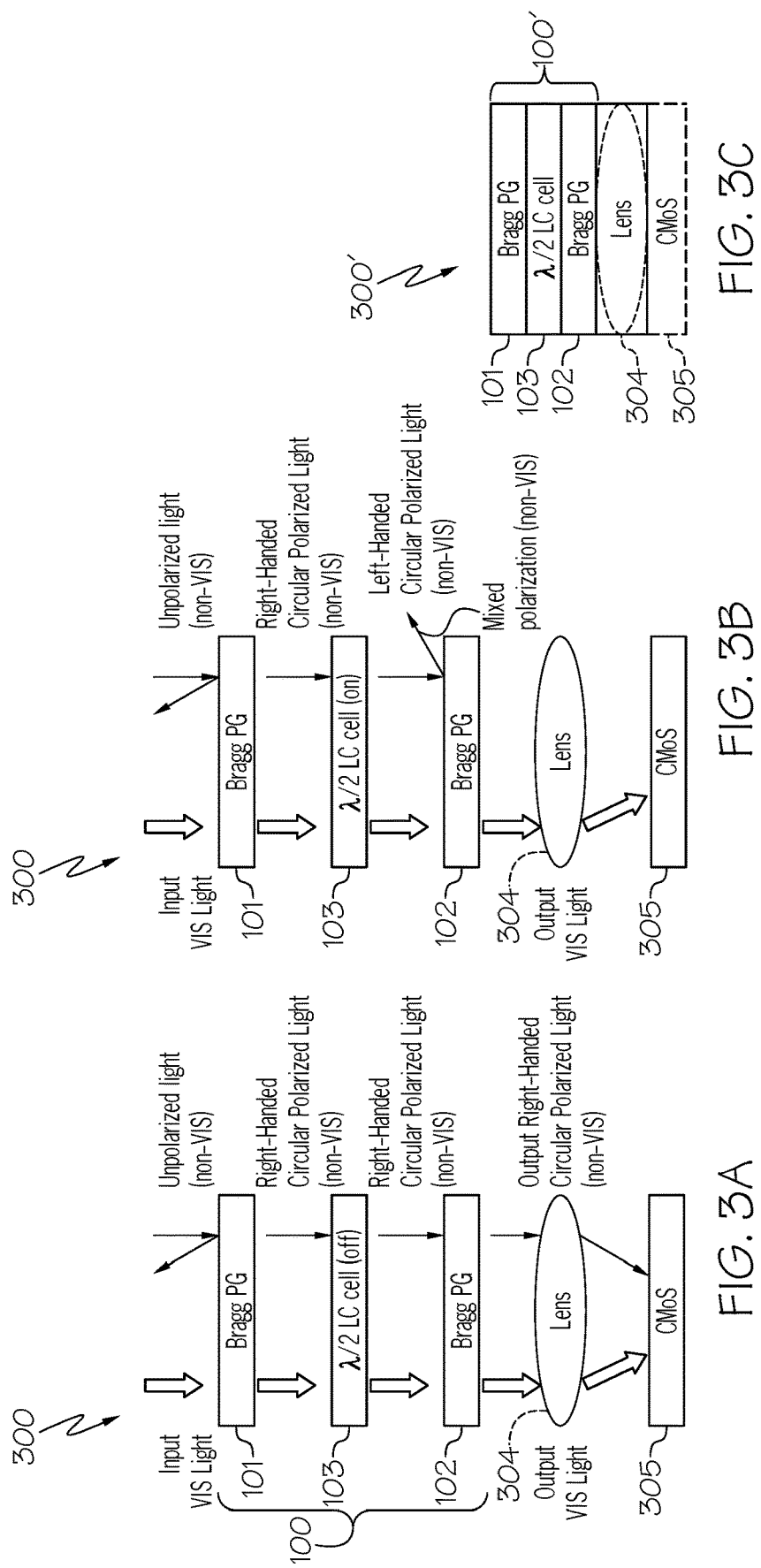

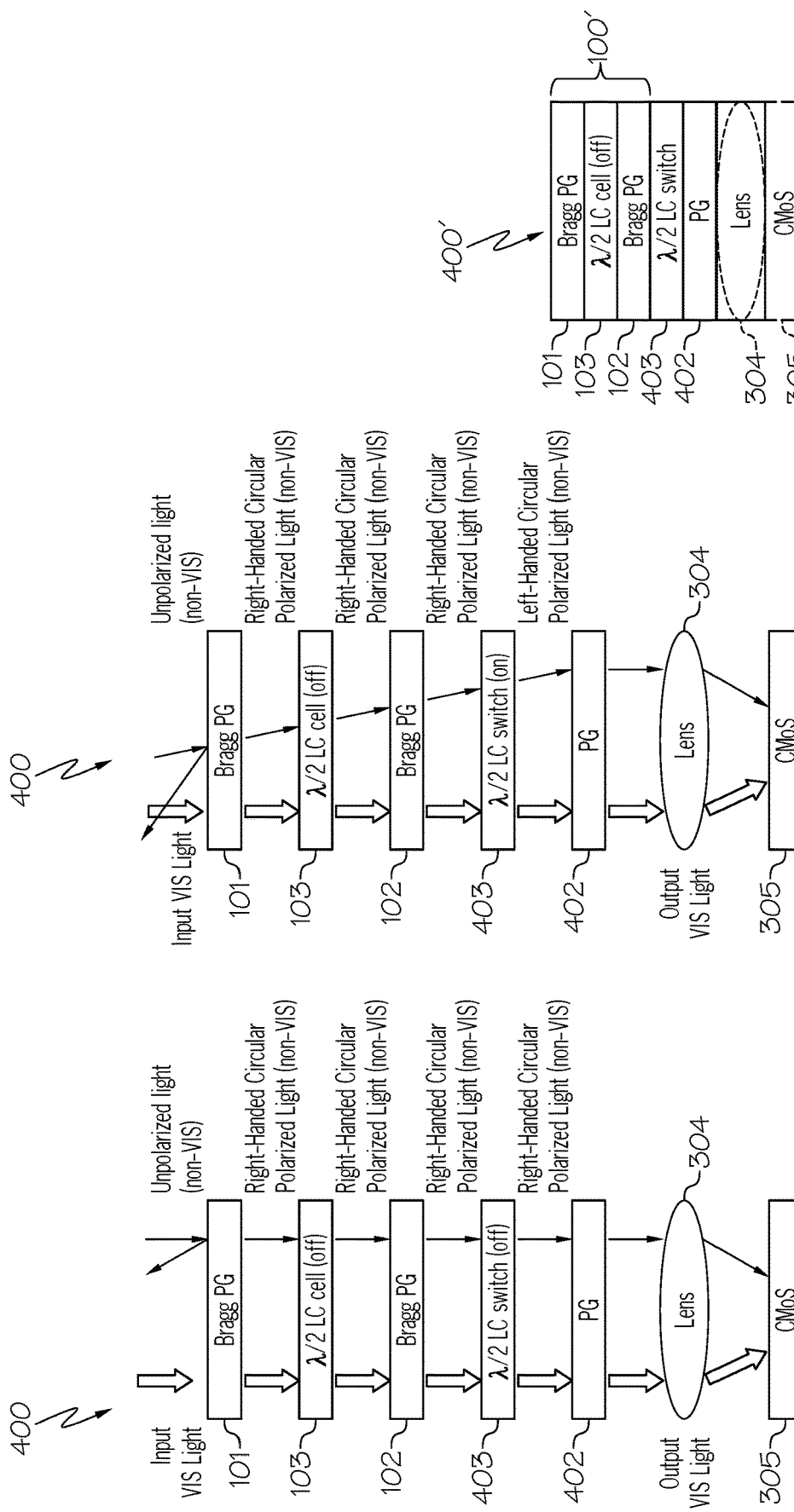

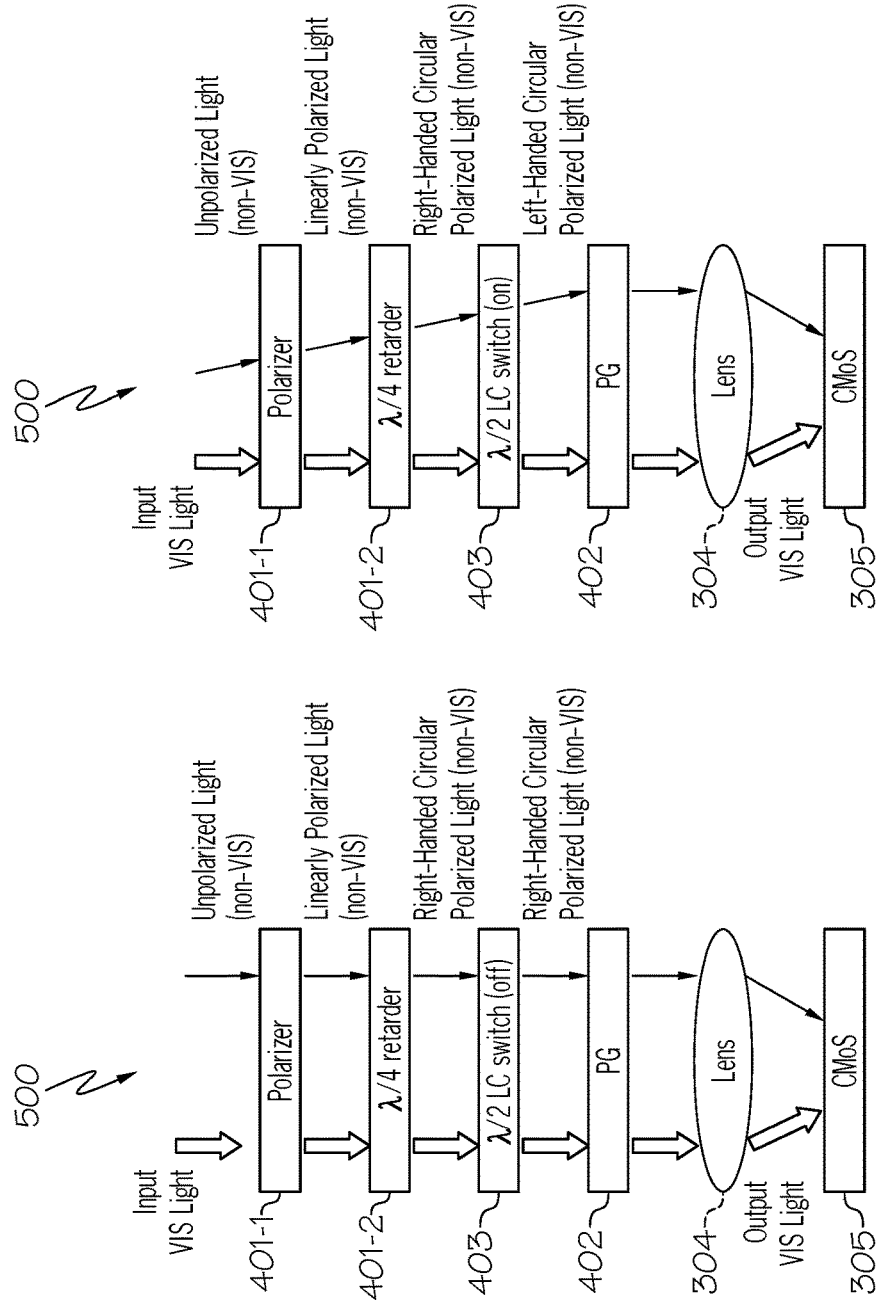

OPTICAL ELEMENTS FOR INTEGRATED IR AND VISIBLE CAMERA FOR DEPTH SENSING AND SYSTEMS INCORPORATING THE SAME

CLAIM OF PRIORITY

This application claims priority from U.S. Provisional Patent Application Nos. 62/975,692 and 62/975,685, both filed Feb. 12, 2020, in the United States Patent and Trademark Office, the disclosures of which are incorporated by reference herein in their entireties.

BACKGROUND

Some augmented reality (AR) systems may employ multiple optical sensors, including, but not limited to, head tracking cameras, depth sensors, photo-video cameras and eye tracking sensors. However, the use of such different optical sensors may result in high costs, complexity, mass, volume, and power consumption. For example, as each sensor may require its own circuit and interface to the computer, system complexity may be high.

Multi-spectral imaging sensors, also called pixelated digital cameras, may assign separate pixels for different wavelengths, such as a color filter mosaic in a traditional digital camera, where the wavelength bands typically include red, green and blue filters for visible light photography and video. Additionally, some cameras may assign pixels to infrared (IR) wavelengths. Many of these employ the IR pixels for three dimensional (3D) depth sensing.

Some imaging sensor systems employ active IR illumination. Categories of 3D sensors that employ active illumination may include time of flight sensors, such as used in LIght Detection And Ranging (LIDAR), and structured-light sensors. In some cases, active IR illumination may be combined with a sensor suitable for visible light imaging. For example, a broadband multi-spectral sensor (such as a CMOS camera) may be incorporated along with sequenced high intensity pulses of IR illumination and pixel-level signal processing, such that both the two dimensional (2D) image and 3D depth of an object or scene can be determined. Some systems may combine passive imaging overlaid onto 3D depth maps.

In some active IR illumination applications, a broadband multi-spectral sensor may be combined with an electrically switchable shutter that sequentially blocks visible and then IR light in an alternating manner. In one example, the switchable device may include a liquid crystal (LC) cell and two linear polarizers whereby either the polarizers or the LC switch is wavelength dependent. In another example, the switchable element may be a switchable Bragg grating (SBG) also called a distributed Bragg reflector, and may be formed using holographic polymer-dispersed liquid crystals. In still another example, the switchable device may include one or more switchable cholesteric LC reflective polarizers.

The mass of multiple sensors may also be significant, particularly in instances where each sensor includes a respective lens and associated mechanical interface, housing, and electrical wiring. The resultant volume of these sensors may be significant as well, for example, which may limit use in spectacle form factors for AR glasses.

SUMMARY

According to some embodiments of the present disclosure, an imaging system comprises one or more optical elements that include at least one switchable element or layer and at least one diffractive element or layer, which are configured to selectively alter a direction of propagation of light within specified wavelengths of operation (for example, light outside of the visible spectrum, such as IR or UV light), without substantially affecting a direction of propagation of light outside of the specified wavelengths of operation (for example, light inside the visible spectrum), also referred to herein as wavelength bands.

The diffractive layer(s) may be wavelength and polarization selective, and may be configured to alter both the polarization and the propagation direction of the incident light that is within the specified wavelengths of operation. For example, the diffractive layer(s) may be configured to transmit light within one wavelength range or band (e.g., light within the visible spectrum having wavelengths between about 400 nm and about 700 nm) without altering a polarization or propagation direction thereof, but may be configured to alter a polarization and propagation direction of light within another wavelength range or band (e.g., the light outside of the visible spectrum), or vice versa.

The switchable layer(s) may be independently switched (responsive to an applied electrical signal) between states that differently affect the polarization of light incident thereon. For example, in some embodiments, the switchable layer(s) may be switched between a first state (e.g., an "off" state) that does not substantially alter a polarization of the light, and a second state (e.g., an "on" state) that alters the polarization of the light (e.g., to an orthogonal polarization state).

In some embodiments, the diffractive layer(s) may be configured to direct light outside of the visible spectrum toward or away from an image sensor in response to a state of the switchable layer. For example, the diffractive layer(s) may include one or more reflection gratings that are configured to diffract the light outside of the visible spectrum in one or more directions away from the image sensor, and in some instances away from the optical element(s) of the imaging system. Some embodiments may thus be configured to direct light within the specified wavelengths of operation into desired direction(s) without the use of additional filtering (e.g., angle filtering) and/or retardation layers at the output of the optical element.

In some embodiments, the switchable layer(s) may not switch entirely from one polarization state to the orthogonal state, and as such may be used to modulate the light within the specified wavelengths of operation passing therethrough. That is, the switchable layer(s) may include intermediate states (between the "off" and "on" states) with respect to effects on the polarization of the incident light within the specified wavelengths of operation.

In some embodiments, the switchable layer(s) and/or the diffractive layer(s) may include birefringent materials or layers, such as (but not limited to) liquid crystal (LC) layers. The switchable layer(s) may include a birefringent liquid crystal layer that can be electrically switched between zero retardation and half-wave retardation (or other retardations) responsive to a voltage applied thereto. In some embodiments, GP elements as described herein may include geometric-phase surfaces or elements that may not be made from liquid crystal materials, such as dielectric or plasmonic metasurfaces.

In some embodiments, the diffractive layer(s) may include one or more geometric phase (GP) elements, such as geometric phase holograms (GPHs) and/or polarization gratings (PGs). The diffractive layer (s) may polarize and diffract incident light within the specified wavelengths of operation into at least two beams (e.g., zero-order output light and first-order output light) having different polarization states and/or different directions of propagation without substantial absorption of any one polarization state. For example, the diffractive layer(s) may provide a beamsplitter that is configured to transmit a first polarization of the light within the specified wavelengths of operation, and is configured to reflect a second, different polarization of the light within the specified wavelengths of operation, or vice versa. The first and second polarizations may include right- and left-hand circular polarizations of light outside of the visible spectrum, respectively.

In some embodiments, the diffractive layer(s) may include a first diffractive layer that is arranged and configured to diffract incident light within the specified wavelengths of operation into a first-order beam in a direction away from the image sensor, and into a zero-order beam for input to the switchable layer. A second diffractive layer may be arranged and configured to diffract the beam output from the switchable layer away from the image sensor in response to the state of the switchable layer.

In some embodiments, the diffractive layers(s) may include one or more Bragg regime polarization gratings (Bragg PGs or BPGs). In some embodiments, the diffraction orders may be approximately circularly polarized with the opposite handedness, regardless of the input polarization state.

In some embodiments, one or more pairs of diffractive layers and switchable layers may be included in the optical element to increase an effective field of view of the imaging system.

In some embodiments, retarders and/or polarizers may optionally be added on either side of the diffractive layer(s) to control both the input and output polarization states. The incident light may be unpolarized in some embodiments, but may be polarized (e.g., by the retarders and/or polarizers) in other embodiments.

In some embodiments, the switchable layer(s) and diffractive layer(s) may define an optical element having a monolithic structure. The layers of the monolithic optical element may be directly on one another, or may include one or more transparent layers therebetween.

According to some embodiments of the present disclosure, a multi-spectral optical imaging device includes a switchable element configured to be switched between first and second states, where one of the first and second states alters a polarization of light, and a geometric phase element arranged to receive the light from the switchable element. The geometric phase element is configured to diffract a first wavelength band of the light to alter a direction of propagation thereof based on the polarization, without substantially altering a direction of propagation of a second wavelength band of the light, responsive to the first state of the switchable element.

In some embodiments, the geometric phase element may be configured to simultaneously transmit the first and second wavelength bands of the light without substantially altering the directions of propagation thereof, responsive to the second state of the switchable element.

In some embodiments, the geometric phase element may be configured to transmit the second wavelength band of the light without substantially altering the direction of propagation and polarization thereof, independent of the first and second states of the switchable element.

In some embodiments, the multi-spectral optical imaging device may further include at least one optical element arranged to provide the light to the switchable element such that the first wavelength band of the light includes a second polarization that is orthogonal to a first polarization.

In some embodiments, the geometric phase element may be configured to diffract the first polarization of the first wavelength band of the light to alter the direction of propagation thereof responsive to the first state of the switchable element, and may be configured to simultaneously transmit the second wavelength band and the second polarization of the first wavelength band of the light without substantially altering the directions of propagation thereof responsive to the second state of the switchable element.

In some embodiments, the geometric phase element may be a second geometric phase element, and the at least one optical element may be a first geometric phase element that is arranged receive unpolarized light comprising the first and second wavelength bands. The first geometric phase element may be configured to diffract the first polarization of the first wavelength band away from the switchable element and to simultaneously transmit the second wavelength band and the second polarization of the first wavelength band to the switchable element without substantially altering directions of propagation thereof.

In some embodiments, the first and/or second geometric phase element may be a Bragg polarization grating.

In some embodiments, the Bragg polarization grating may be configured to diffract the first polarization of the first wavelength band into a reflective first-order direction, and to transmit the second polarization of the first wavelength band into a zero-order direction.

In some embodiments, a camera may be arranged to receive the light from the geometric phase element. The camera may include an image sensor that is configured to detect the first and second wavelength bands of the light.

In some embodiments, the image sensor may be configured to capture first and second image data responsive to the first and second states of the switchable element, respectively. A signal processor may be configured to calculate image data for the first wavelength band of the light based on subtraction of the first and second image data.

In some embodiments, the image sensor may be configured to capture second and third image data responsive to activation and deactivation of an illumination source, respectively, during sequential operations of the switchable element in the second state. The illumination source may be configured to output light emission comprising the first wavelength band. A signal processor may be configured to calculate image data for the first wavelength band of the light based on subtraction of the second and third image data.

In some embodiments, the switchable element may be a first switchable element and the geometric phase element may be a first geometric phase element. A second switchable element and a second geometric phase element may be arranged between the geometric phase element and the camera. The second switchable element may be configured to be switched between states that alter and do not alter the polarization of the light, respectively. The second geometric phase element may be configured to direct the first polarization of the first wavelength band of the light towards the image sensor in a first direction to define a first field of view and to direct the second polarization of the first wavelength band towards the image sensor in a second direction to define a second field of view, responsive to the states of the second switchable element, respectively.

In some embodiments, the at least one optical element may include a polarizer arranged to receive unpolarized light, and a retarder configured to alter a polarization of polarized light from the polarizer to provide the light to the switchable element.

In some embodiments, the geometric phase element may be configured to direct the first polarization of the first wavelength band towards the image sensor in a first direction responsive to the first state of the switchable element to define a first field of view, and to direct the second polarization of the first wavelength band toward the image sensor in second direction responsive to the second state of the switchable element to define a second field of view.

In some embodiments, the geometric phase element may be a first geometric phase element. The multi-spectral imaging device may further include an illumination source configured to output light emission comprising the first wavelength band in synchronization with the first and second states of the switchable element, and second geometric phase element arranged to receive the light emission from the illumination source. The second geometric phase element may be configured to direct the first polarization of the first wavelength band of the light emission into a first direction to define a first field of illumination, and to direct the second polarization of the first wavelength band of the light emission into a second direction to define a second field of illumination.

In some embodiments, the first geometric phase element may be arranged to receive the light from a first region of the switchable element, the illumination source may be arranged to provide the light emission to a second region of the switchable element that is adjacent the first region, and the second geometric phase element may be arranged to receive the light emission from the second region of the switchable element.

In some embodiments, the switchable element may be a first switchable element, and a second switchable element may be arranged to receive the light emission from the illumination source and to provide the light emission to the second geometric phase element. The second switchable element may be configured to be switched between states that alter and do not alter the polarization of the light emission responsive to the first and second states of the first switchable element, respectively.

In some embodiments, the illumination source and the camera may be separated by a distance configured to provide parallax therebetween, and the light emission may provide a structured light pattern.

In some embodiments, the second geometric phase element may include optical axis orientations that vary linearly to provide the light emission in the structured light pattern.

In some embodiments, the at least one optical element, the switchable element, the first geometric phase element, and the camera may define a first light sensor, and the illumination source and the second geometric phase element may define a first light source. The multi-spectral optical imaging device may further include a second light sensor, and a second light source configured to output light emission comprising the first wavelength band in synchronization with operation of the second light sensor. The second light source and the second light sensor may be separated by the distance configured to provide parallax therebetween.

In some embodiments, the second geometric phase element may include optical axis orientations that vary non-linearly to provide a lens power for the light emission.

In some embodiments, the multi-spectral optical imaging device may further include an illumination source configured to emit the light comprising the first wavelength band and arranged to provide the light to the switchable element.

The geometric phase element may be configured to direct a first polarization of the first wavelength band of the light emission into a first direction to define a first field of illumination, and to direct a second polarization of the first wavelength band of the light emission into a second direction to define a second field of illumination.

In some embodiments, the multi-spectral optical imaging device may be implemented in a spectacle form factor.

In some embodiments, the second wavelength band may include light within a visible light spectrum, and the first wavelength band may include light outside of the visible light spectrum.

In some embodiments, the first wavelength band comprises infrared light.

In some embodiments, the switchable element and the geometric phase element may be optical films that are stacked to define a monolithic structure.

According to some embodiments, an optical shutter includes a first reflective Bragg polarization grating, a liquid crystal layer on the first reflective Bragg polarization grating, and a second reflective Bragg polarization grating on the switchable liquid crystal layer. The liquid crystal layer is configured to be switched between first and second states, where one of the first and second states alters a polarization of light. The first and second reflective Bragg polarization gratings are respectively configured to diffract a first polarization of the first wavelength band of the light into a reflective first-order direction and to transmit a second polarization of the first wavelength band of the light into a zero-order direction without substantially altering a direction of propagation of a second wavelength band of the light.

In some embodiments, the first and second reflective Bragg polarization gratings may be respectively configured to transmit the second wavelength band of the light independent of the first and second states of the liquid crystal layer.

In some embodiments, the second reflective Bragg polarization grating may be configured to diffract the first polarization of the first wavelength band responsive to the first state of the liquid crystal layer, and may be configured to transmit the second polarization of the first wavelength band responsive to the second state of the liquid crystal layer.

In some embodiments, the first polarization may be orthogonal to the second polarization, and the first Bragg polarization grating may be configured to provide the light to the liquid crystal layer such that the first wavelength band of the light comprises the second polarization.

In some embodiments, the first wavelength band of the light may comprise the second polarization and may be substantially free of the first polarization.

In some embodiments, the first and second polarizations may be circular polarizations of opposite handedness.

In some embodiments, the second wavelength band may comprise light within a visible light spectrum, and the first wavelength band may comprise light within an infrared spectrum.

According to some embodiments, a multi-spectral optical imaging detector includes a camera including an image sensor that is configured to detect first and second wavelength bands of light, and an optical shutter. The optical shutter includes a switchable liquid crystal layer and a geometric phase element configured to selectively transmit or diffract the first wavelength band of the light towards or away from the image sensor, respectively, based on a polarization thereof, and to transmit the second wavelength band of the light to the image sensor independent of the polarization thereof.

In some embodiments, the switchable liquid crystal layer may be configured to be switched between first and second states to output orthogonal first and second polarizations of the light, respectively. Responsive to the first state of the switchable liquid crystal layer, the geometric phase element may be configured to diffract the first polarization of the first wavelength band of the light away from the image sensor. Responsive to the second state of the switchable liquid crystal layer, the geometric phase element may be configured to simultaneously transmit the second wavelength band and the second polarization of the first wavelength band of the light to the image sensor.

In some embodiments, the image sensor may be configured to capture coincident first and second image data responsive to the first and second states of the switchable element, respectively, and calculation of image data for the first wavelength band of the light may be based on subtraction of the first and second image data.

In some embodiments, the image sensor may be configured to capture coincident second and third image data responsive to activation and deactivation, respectively, of an illumination source providing light emission comprising the first wavelength band of the light during sequential operations of the switchable element in the second state, and calculation of image data for the first wavelength band of the light may be based on subtraction of the second and third image data.

In some embodiments, the geometric phase element may be a second reflective Bragg polarization grating, the optical shutter may further include a first reflective Bragg polarization grating, and the switchable liquid crystal layer may be between the first and second reflective Bragg polarization gratings. The first and second reflective Bragg polarization gratings may be respectively configured to diffract the first polarization of the first wavelength band of the light into a reflective first-order direction, and to transmit the second polarization of the first wavelength band of the light into a zero-order direction.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

BRIEF DESCRIPTION OF THE DRAWINGS

FIGS. 3A, 3B, and 3C are schematic diagrams illustrating an arrangement of layers in an optical element that provides an integrated depth sensor and photo-video camera in accordance with some embodiments of the present disclosure.

FIGS. 4A, 4B, and 4C are schematic diagrams illustrating an arrangement of optical elements that provides an integrated depth sensor and photo-video camera with a variable field of regard in accordance with some embodiments of the present disclosure.

FIGS. 5A, 5B, and 5C are schematic diagrams illustrating an arrangement of optical elements that provides a variable field of regard in accordance with some embodiments of the present disclosure, independent of combined photo/video and depth image sensor applications.

DETAILED DESCRIPTION

Figure 1A:
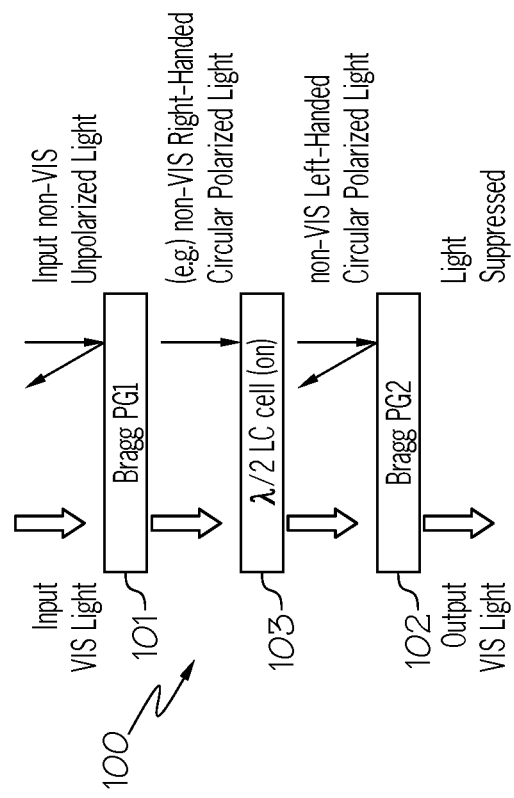
FIGS. 1A, 1B, 1C, and 1D are schematic diagrams illustrating an arrangement of layers in an optical element that provides an optical shutter according to some embodiments of the present disclosure.

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components, and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined various ways and/or combinations beyond those specifically described in the examples herein.

Embodiments of the present disclosure may arise from realization that, in optical systems that utilize multiple optical sensors, cost, mass, volume and power can be reduced by eliminating sensors (at the cost of system capability) and/or integrating functionality such that fewer sensors can be used. In particular, in some applications, the photo-video sensor may be used less frequently, and thus, may be a candidate for integration with one or more of the other sensors. For example, while the photo-video sensor (which may include an image sensor and one or more lenses configured to direct or focus light onto the image sensor; also referred to herein as a camera) may have a relatively wide field of view, its field of view may be insufficient for simultaneous localization and mapping (SLAM) tracking.

Some embodiments of the present disclosure provide optical elements, such as an electrically switchable optical shutter, which may be used for integrating a photo-video camera with a depth sensor. While depth sensor technology may generally require infrared (IR) light, such functionality may be difficult to integrate with a color camera. For instance, complementary metal-oxide-semiconductor (CMOS) sensors may be used for cameras found in cell phones typically include an IR blocking filter, as the ambient IR would contribute additional signal in the color pixels (red in particular) and result in a photograph or image with errors in the color balance/rendering. More particularly, as certain dyes for textiles may not absorb IR, captured images including such objects could potentially look more red than they really are; thus to absorb IR, an IR absorber may be required.

Also, several technologies may be used for depth sensing, including stereo cameras (which may use parallax between the camera images to establish depth), time of flight cameras (e.g., as used in HoloLens® and XBoX One® Kinect®), and structured light cameras (e.g., as used in XBoX 360®). Time of flight and structured light cameras may require emission of IR or ultraviolet (UV) light (i.e., light that is outside of the visible spectrum of human vision) for operation. That is, the sensors used in time of flight and structured light cameras may be active, in that the systems actively emit light (e.g., IR or UV light) that, when reflected from real world objects, is imaged by the optical sensor. In some examples, the IR or UV light may be focused to a complementary metal-oxide-semiconductor (CMOS) image sensor. In structured light sensors, the pixel architecture may not be specific to the depth sensor (other than the fact that the sensor is required to detect light outside of the visible spectrum). In time of flight sensors, the pixel architecture may differ, for example, in instances where the phase of the return signal is determined from the detected light.

a. Embodiments described herein can provide optical elements that allow for multiple imaging applications (e.g., depth sensing and photo-video imaging) using the same sensor. Although illustrated primarily with reference to examples using PGs (and in particular, Bragg PGs) as diffractive layers, it will be understood that embodiments of the present disclosure are not limited to PGs, and that elements described hereinafter as PGs (including Bragg PGs) may be more generally implemented by GP elements in accordance with embodiments of the present disclosure, with the PG being a specific example of a GP element having a linear phase profile or constant periodicity. However, in other embodiments, GP elements having a non-linear phase profile or varying periodicity may be used.

b. Also, while illustrated primarily with reference to examples of optical elements that are configured to transmit visible light without altering a polarization or propagation direction thereof, and are configured to alter a polarization and/or propagation direction of light outside of the visible spectrum, it will be understood that embodiments of the present disclosure are not so limited. For example, other embodiments may include optical elements that are configured to transmit light outside of the visible spectrum, and are configured to alter a polarization and/or propagation direction of visible light. Further embodiments may include optical elements that are configured to transmit a broad wavelength band of light without substantially altering the propagation direction thereof, and selectively alter the polarization and/or propagation direction of one or more specified wavelength bands of light, or vice versa. The terms "wavelength range" and "wavelength band" may be used interchangeably herein.

FIGS. 1A to 1D illustrate an arrangement of layers in an optical element 100, 100' that provides an optical shutter in accordance with some embodiments of the present disclosure. The optical element 100, 100' includes a first GP element (e.g., a polarization grating 101, shown as a first Bragg polarization grating PG1), a switchable optical layer or element (shown as a liquid crystal (LC) cell 103), and a second GP element (e.g., a polarization grating 102, shown as a second Bragg polarization grating PG2). The optical element 100, 100' is configured to direct light of a specified wavelength range of operation (shown by way of example with reference to non-visible light, e.g., IR light) towards (in FIGS. 1A and 1C) or away (in FIGS. 1B and 1D) from a direction of propagation of visible light (VIS).

Figure 1B:
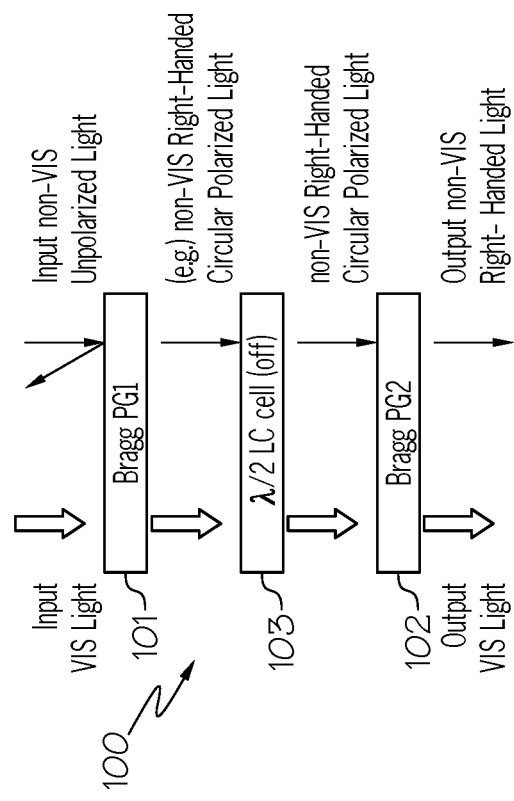
Figure 1C:
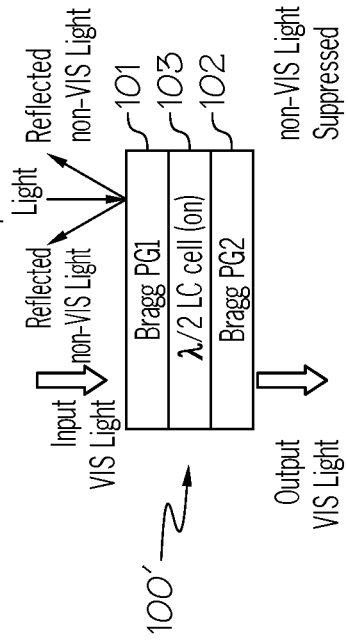
Figure 1D:
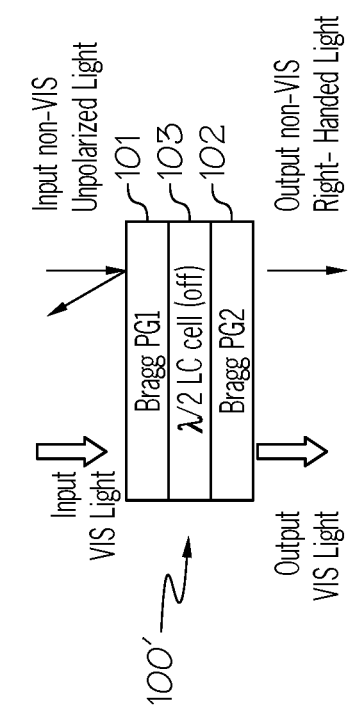

The switchable optical layer or element 103 is configured to be switched between first and second states, wherein at least one of the first and second states alters a polarization of light. FIGS. 1A and 1C illustrate the switchable optical layer 103 in a first ("off") state that does not substantially affect the polarization of light passing therethrough, while FIGS. 1B and 1D illustrate the switchable optical layer 103 in a second ("on") state that alters the polarization of the light passing therethrough, illustrated in the examples herein as providing halfwave ($\lambda/2$) retardation. FIGS. 1C and 1D illustrate a configuration where the layers 101, 103, 102 are stacked directly on one another to define a monolithic structure 100'; however, it will be understood that intervening layers (e.g., transparent spacer layers and/or electrode layers) may be present (e.g., between two or more of the layers) in some embodiments. That is, some embodiments of the present disclosure may include a reflective PG or GPH 101, a polarization switch 103, and a reflective PG/GPH 102, which attenuates light based on reflection rather than subsequent transmission and filtering layers, and is polarization independent.

In the examples of FIGS. 1A to 1D, the GP elements 101 and 102 are implemented by Bragg PGs (BPGs), but it will be understood that embodiments of the present disclosure are not limited to the use of BPGs as the GP elements 101 and/or 102. In some embodiments, the BPGs 101 and/or 102 may be a fixed polymer film, formed by successively coating one or more sublayers of LC material onto a photo-alignment surface pattern, with an optic axis orientation (also called a nematic director profile) that varies linearly and is fixed in the film, forming a periodic grating period along an in-plane direction (i.e., in one or more directions along or defined by the surface of the element 101, 102). The optic axis orientation profile may also vary in the out-of-plane direction (i.e., in one or more directions other than defined by the surface of the element 101, 102, e.g., in a direction normal to the surface) due to a twist induced by the chirality of the LC material over the thickness of the element 101, 102. The one or more sublayers may each have an independently controllable thickness and/or twist angle. The grating period, thickness, and/or sublayer twist rate may determine the grating slant angle, which may be different for one or more of the sublayers.

The grating slant angle (including one or more of the determinative factors thereof) may be configured to provide wavelength and polarization selectivity, such that the GP elements 101 and/or 102 may be configured to diffract a specified wavelength band of light to alter its direction of propagation based on the polarization of the light, while transmitting another specified wavelength band of light without substantially altering its direction of propagation. For example, the GP elements 101 and/or 102 may be configured to diffract one polarization of light within a specified wavelength band into one or more first-order directions (such as one of the first-order directions shown in FIG. 11), but may be configured to transmit a different polarization of the light within the specified wavelength band (and/or light of any polarization that is outside of the specified wavelength band) into a zero-order direction (such as the transmissive zero-order direction shown in FIG. 11).

More particularly, the BPGs 101 and 102 may have strong polarization selectivity for non-visible (non-VIS) light, such as UV or IR light. The BPGs 101 and 102 may thus transmit one polarization of the non-visible light and diffract the orthogonal polarization of the non-visible light, to provide non-visible light output that is substantially free of the orthogonal polarization. For example, the BPGs 101 and 102 may be configured to transmit non-visible polarized light of one circular handedness (shown with reference to right-handed circular polarized light by way of example) without altering propagation direction, and to diffract the non-visible light of the orthogonal circular polarization (shown with reference to left-handed circular polarized light by way of example), with contrast ratios of on the order of hundreds to 1. The light diffracted by the Bragg PGs 101 and/or 102 (in this example, non-visible light) may propagate primarily into one of the first-orders (either m=+1 or m=−1), while the remaining (e.g., undiffracted) light may propagate into the zero-order (m=0), where the polarization of the input light strongly selects the ratio between diffracted and undiffracted light. In contrast, some Raman-Nath (e.g., conventional) PGs may act oppositely, where diffracted light can propagate into both first-orders (m=+1 and m=−1), and where polarization of the input light strongly selects the ratio between these two first-orders and has nearly no effect on the undiffracted light.

Figure 11:
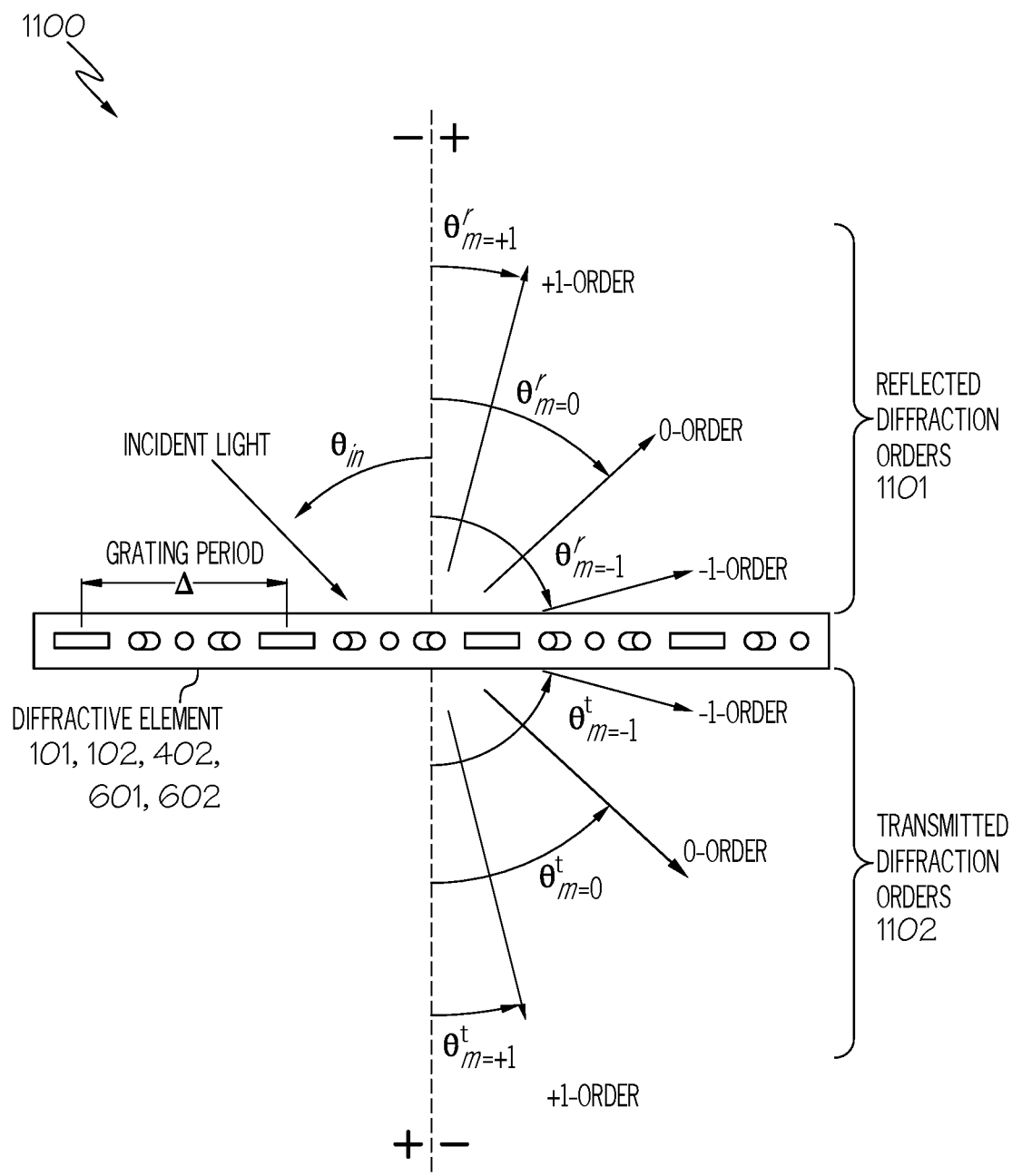
FIG. 11 is a schematic diagram illustrating transmitted and reflected diffraction orders with respect to the incident side of a diffractive surface.

Depending on the grating slant angle, the BPGs 101 and/or 102 (and/or other diffractive optical elements described herein) can be either reflective or transmission diffraction gratings, reflecting or transmitting their first-order diffracted light, respectively, as illustrated by the diffractive optical element 1100 shown in FIG. 11. As used herein, a reflective or reflection grating may be configured to diffract a specified wavelength band of incident light (shown with reference to an angle of incidence $\theta_{in}$) into first-order directions on the same side of the grating as the incident light, also referred to herein as reflected diffraction orders 1101 (shown with reference to reflective first-order angles $\theta^r_{m=\pm 1}$ or directions relative to a reflective zero-order angle $\theta^r_{m=0}$ or direction). A transmission grating may be configured to diffract a specified wavelength band of incident light into first-order directions on the opposite side of the grating as the incident light, also referred to herein as transmitted diffraction orders 1102 (shown with reference to transmissive first-order angles $\theta^t_{m=\pm 1}$ or directions relative to a transmissive zero-order angle $\theta^t_{m=0}$ or direction). The transmissive zero-order angle $\theta^t_{m=0}$ or direction may be substantially similar to the direction of propagation of the incident light, and may be referred to herein as transmitted light. The diffractive optical element 1100 may be configured to diffract light without substantially altering the direction of propagation (e.g., into the transmissive zero-order angle $\theta^t_{m=0}$ or direction) or to alter the direction of propagation (e.g., into any of the transmissive first-order angles $\theta^t_{m=\pm 1}$ or directions, or any of the reflective first-order angles $\theta^r_{m=\pm 1}$ or directions) based on the polarization of the light. The diffractive optical element 1100 may include any of the GP elements, PGs and/or BPGs (e.g., 101, 102, 402, 601, and/or 602) described herein.

Another characteristic of the BPGs 101 and/or 102 is that their efficiency (the fraction of light directed into a transmission or reflection diffraction order, as expressed as a percentage of the incident light) can approach 100% for one polarization of the input light. The efficiency of the BPGs 101 and/or 102 can be designed or configured to be either high or low for relatively wide spectral bandwidths or wavelength ranges, and either high or low for relatively wide angular bandwidths or fields of regard (e.g., fields of view).

Accordingly, the BPGs 101 and/or 102 may be wavelength-selective, allowing transmission of light of some wavelength therethrough without substantially affecting direction or angle of propagation, while diffracting light of other wavelengths so as to alter direction or angle of propagation depending on the polarization thereof. For example, the optical axis orientations of the BPGs 101 and/or 102 may be configured (e.g., so as to define a particular a slant angle, period, thickness, and/or chiral twist) to alter the propagation direction of light of a specified wavelength band, without substantially affecting the propagation direction of light outside the specified wavelength band. Wavelength and angular bandwidths can be tailored to maximize or minimize diffraction efficiencies for nearly any input wavelength or angle range; in some embodiments described herein, the BPGs 101 and/or 102 can be configured to have high reflection efficiency for IR light for one circular polarization, but can be configured to be transparent for IR light with the orthogonal polarization and for visible light with all polarizations.

BPGs in accordance with embodiments of the present disclosure may differ from SBGs in several ways. For example, BPGs may be formed from different types of materials than SBGs. Also, BPGs may function based on different types of phases, where BPGs function by the geometric phase (also called Pancharatnam-Berry phase) and SBGs operate by conventional propagation phase (also called optical path length differences). SBGs are switchable and may be thermally unstable, whereas BPGs are typically fixed (i.e., with fixed or non-changeable optical axis orientations) and generally insensitive to temperature changes typically encountered in operation as described herein. SBGs may not be strongly polarization selective in comparison to BPGs. Also, SBGs may be limited in angular bandwidth and efficiency compared to BPGs as used herein.

Referring to the examples of FIGS. 1A to 1D, an optical shutter 100, 100' includes a switchable LC cell 103 between two BPGs 101 and 102. The BPGs 101 and 102 are configured to diffract one polarization of a specified wavelength band of light (described in the following example with reference to non-visible light and circular polarizations) strongly (e.g., >80%) into a reflective first-order diffraction direction while transmitting the orthogonal polarization of the specified wavelength band of light into a zero-order direction. The BPGs 101 and 102 are also configured to be transmissive to another wavelength band of light (described in the following examples with respect to visible light) of any polarization.

The LC cell 103 has two states, controlled by the electrical signal applied to the LC layer: in the first state (e.g., the "on" state), the net retardation effect of the LC cell 103 is sufficient to convert the non-visible light from one circular polarization handedness to its orthogonal handedness (e.g., a half-wave ($\lambda/2$) retardation); and in the second state, the net retardation does not appreciably change the non-visible light polarization (e.g., a zero-wave retardation). While the LC cell 103 is primarily described herein as a single element switch, embodiments of the present disclosure are not limited thereto. For example, the LC cell 103 may be a subassembly that further includes one or more birefringent compensation films in order to improve the retardation behavior.

The BPGs 101 and 102 are configured to act as wavelength-selective reflective polarizers, diffracting non-visible light into first-order directions based on the polarization thereof, while transmitting visible light. The optical shutter configurations 100, 100' of FIGS. 1A to 1D are configured to operate on unpolarized input light (both visible and non-visible) incident on the BPG 101. Visible light is transmitted through all three elements 101, 103, 102 without substantially altering polarization and/or propagation direction (i.e., except for incidental losses that may be caused by interface Fresnel reflections and/or absorption of the shutter elements), independent of the states of the LC cell 103. One polarization (shown as the left-hand circular polarization) of the non-visible (e.g., UV or IR) light is strongly reflected away from the LC cell 103 into a first-order diffraction direction by the BPG 101, while the orthogonal circular polarization (shown as the right-hand circular polarization) is transmitted into the LC cell 103.

Depending on the electronic state of the optical shutter 100, 100', two behaviors are possible for the non-visible light that is transmitted by the BPG 101. As shown in FIGS. 1A and 1C, in the first state (with the LC cell 103 in the "off" state), the LC cell 103 does not alter polarization of light passing therethrough, and thus the non-visible light output from the LC cell 103 has a right-handed circular polarization. The BPG 102 is configured to transmit the right-handed circular polarization of the non-visible light therethrough without substantially altering the propagation direction and/or polarization thereof, simultaneously with the visible light (independent of the polarization thereof), thereby providing both the visible light and the non-visible light (in particular, the right-handed circular polarization of the non-visible light) as an output of the optical shutter 100, 100' responsive to the state of the LC cell 103. As shown in FIGS. 1B and 1D, in the second state (with the LC cell 103 in the "on" state), the LC cell 103 alters the polarization of the light passing therethrough, and thus the non-visible light output from the LC cell 103 has a left-handed circular polarization. The BPG 102 is configured to strongly reflect the left-handed circular polarization of the non-visible light into a reflective first-order direction (for example, back through the LC cell 103 and first BPG 101), thereby suppressing non-visible light output from the optical shutter 100, 100'. In some embodiments, the slant angles and/or grating period azimuth directions of are configured such that the BPG 101 does not reflect light received from the second BPG 102 back into the LC cell 103.

Figure 2B:
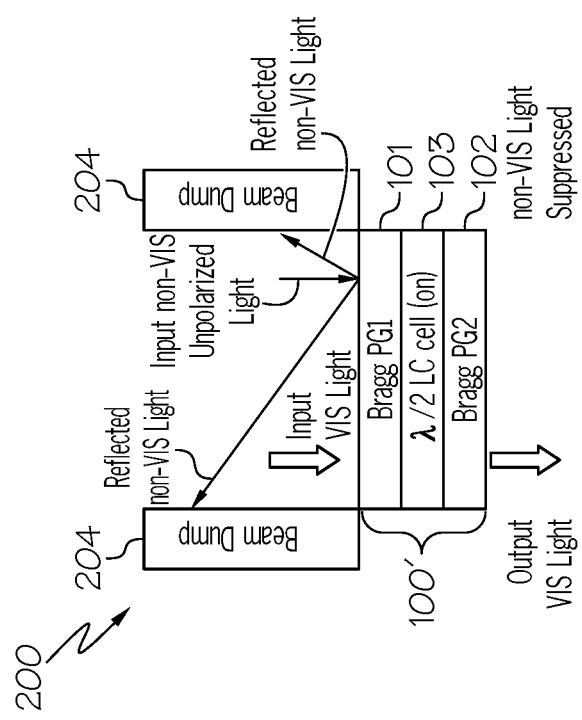
FIGS. 2A and 2B are schematic diagrams illustrating an arrangement of layers in an optical element that provides an optical shutter according to further embodiments of the present disclosure.
Figure 2A:
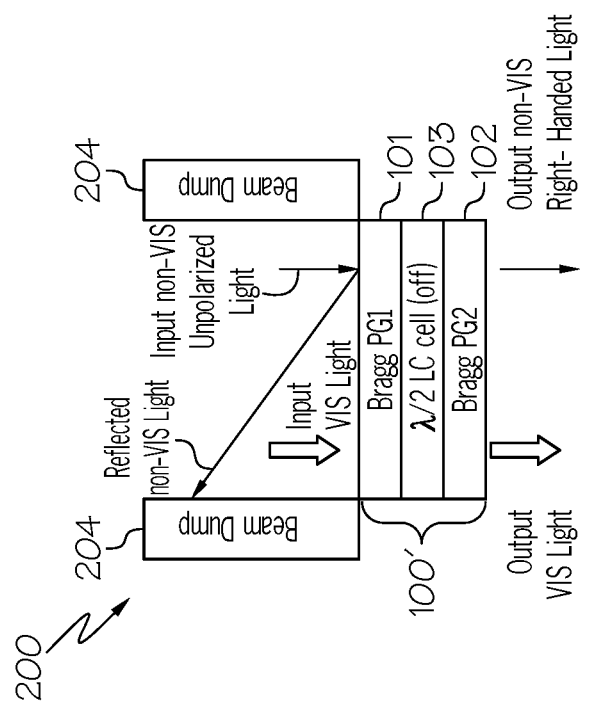

FIGS. 2A and 2B are schematic diagrams illustrating an arrangement of layers in an optical element 200 that provide an optical shutter according to further embodiments of the present disclosure. As shown in FIGS. 2A and 2B, an optical element 200 includes the monolithic structure 100' of FIGS. 1C and 1D, in first and second states (e.g., with the LC cell 103 in the off and on states), respectively. The embodiments of FIGS. 2A and 2B operate similarly as shown in FIGS. 1C and 1D, respectively, and further include a light-absorbing beam dump 204 or other light-blocking structure that is configured to limit the non-visible light from propagating outside the optical element 200. More particularly, in both the off state of the LC cell 103 (as shown in FIG. 2A) and the on state of the LC cell 103 (as shown in FIG. 2B), the non-visible light (here, the left-hand circular polarization of the non-visible light) that is diffracted by the BPG 101 into the reflective first-order direction is collected or otherwise blocked by the beam dump 204 from propagating beyond the element 200. More generally, FIGS. 2A and 2B illustrate that a light-blocking structure 204 may be arranged in the reflective first-order diffraction direction to prevent leakage of the reflected polarization of the specified wavelength band of the light outside of the device 200.

FIGS. 3A to 3C illustrate an arrangement of layers in an optical element 300, 300' that provides an integrated depth sensor and photo-video camera in accordance with some embodiments of the present disclosure, also referred to herein as a multi-spectral optical imaging detector. In particular, the examples of FIGS. 3A to 3C illustrate the elements 101, 103, 102 defining the optical shutter 100, 100' of FIGS. 1A to 1D arranged to direct light of a specified wavelength range or band of operation towards (in FIG. 3A) or away (in FIG. 3B) from a lens 304. The lens 304, which may in some embodiments be a GP element such as a geometric phase lens, is configured to focus or otherwise direct the light output from the optical shutter 100, 100' on an image sensor 305, illustrated by way of example as a CMOS image sensor. The lens 304 and the image sensor 305 may collectively be referred to herein as a camera, with the lens 304 arranged to direct the light from a geometric phase element (e.g., the second BPG 102 or the PG 402 described below) to the image sensor 305. FIG. 3C illustrates a configuration where the layers (101, 103, 102, and optionally, 304) of the optical element are sequentially stacked directly on one another to define a monolithic structure 300'; however, it will be understood that intervening layers (e.g., transparent spacer layers and/or electrode layers) may be present (e.g., between two or more of the layers) in some embodiments.

The image sensor 305 is operable to detect or capture light of multiple wavelength bands. For example, the image sensor 305 may be configured to detect both visible light within the visible spectrum (e.g., light having wavelengths between about 400 nm and about 700 nm) and IR light (e.g., light having wavelengths of about 700 nm to about 1000 nm or more) to produce images from both. In some embodiments, the image sensor 305 may be operable to detect light having wavelengths of less than 400 nm (e.g., UV light) in addition or as an alternative to the IR light detection. More generally, the image sensor 305 may be configured to detect light in multiple wavelengths bands, including wavelength bands within the visible spectrum and/or outside the visible spectrum. In some embodiments, the image sensor may represent a subpixel of a pixel defined by multiple image sensors, for example, a red, green, or blue subpixel. As such, the image sensor 305 may include a red, green or blue color filter thereon in some embodiments. While illustrated with reference to a CMOS image sensor in the drawings, it will be understood that embodiments of the present disclosure are not limited to particular types of image sensors. For example, the image sensor 305 may be a charge-coupled device (CCD) sensor in some embodiments.

The first polarization grating 101, the switchable optical layer 103 in the "on" state, and/or the second polarization grating 102 may be configured to alter the polarization of incident light that is within specified wavelength band(s) of operation (in the examples herein, non-visible light, including IR or UV light), but may allow light outside their wavelengths of operation (in the examples herein, visible light) to pass therethrough unaffected. The first polarization grating 101 and the second polarization grating 102 are also configured to alter the direction of propagation of the incident light that is within their specified wavelength band (s) of operation. In particular, the first polarization grating 101 and the second polarization grating 102 are configured to diffract incident light into zero-order and non-zero-order (e.g., first-order) beams having different propagation directions.

Although embodiments of the present disclosure are not limited to any particular type of diffractive layer, in example embodiments described herein, the GP elements 101 and 102 are implemented by PGs, and specifically by Bragg PGs. Bragg PGs may provide a higher angular bandwidth (supporting the full field of view of a typical photo-video or depth sensor) and large diffraction angles (e.g., up to about 900 or more between the zero- and first-order beams) with high diffraction efficiency (e.g., approximately or up to 100%). In some embodiments, one or more of the Bragg PGs may be formed using LC materials, as described for example in U.S. Pat. No. 10,859,740 to Escuti et al, the disclosure of which is incorporated by reference herein. Bragg PGs may be formed using a bulk, chiral nematic liquid crystal polymer (LCP) network material, also called reactive mesogens. In some instances, Bragg PGs may be referred to as Polarization Volume Gratings (PVGs), among other names.

The state (e.g., "on" or "off") of the switchable optical layer 103 may be controlled by one or more external controllers or processors. In some embodiments, the switchable optical layer 103 may be formed using LC materials, as described for example in U.S. Pat. No. 8,537,310 to Escuti et al, the disclosure of which is incorporated by reference herein. LC materials that may be used in accordance with embodiments of the present disclosure include, but are not limited to, twisted-nematic, vertical alignment, blue-phase, etc., without limitation to the particular "on" (halfwave retardation) or "off" (zero retardation) states described herein.

As shown in FIGS. 3A and 3B, in operation, the Bragg PG 101 is a reflection grating, which means the spectral bandwidth may be relatively small or narrow (e.g., the operational wavelength band may be about 50 nm or less, for example, about 25 nm or less) but the angular bandwidth (the field of view over which the diffraction efficiency is high) is relatively high. More generally, the spectral bandwidth of the PG 101 may be configured based on the spectral bandwidth of a desired light emission source (such as a laser), accounting for drift in the spectral output of the emission source due to temperature.

In the example of FIGS. 3A and 3B, the Bragg PG 101 receives the unpolarized input light (both within and outside the specified wavelength band) and reflects or diffracts a first polarization of the light within the specified wavelength band (in this example, the left-handed circular polarization, LHC) into a first-order beam (labeled as 'mixed polarization') while transmitting a second, different polarization (e.g., an orthogonal polarization) of the light within the specified wavelength band (in this example, the right-handed circular polarization, RHC) as a zero-order beam to the switchable optical layer 103 (e.g., a halfwave ($\lambda/2$) LC switch). In the examples herein, the light within the specified wavelength band is described with reference to non-visible (e.g., IR) light and circular polarizations (LHC, RHC) by way of example, but the optical elements/layers described herein may be configured to operate on any specified wavelength bands and/or polarizations based on the respective characteristics thereof (e.g., the grating slant angle, period, thickness, and/or chiral twist).

In FIG. 3A, the switchable optical layer 103 is an LC cell in the "off" state (e.g., with no voltage applied thereto). The orientation of the LC molecules are such that the RHC polarized non-visible light within the specified wavelength band passes through the $\lambda/2$ LC cell 103 with its polarization unaltered, and falls incident on the Bragg PG 102. The Bragg PG 102 may be the same as the Bragg PG 101, but may be rotated about the optical axis by 180 degrees (i.e., in an anti-parallel orientation relative to Bragg PG 101). The RHC polarized non-visible light within the specified wavelength band passes through the Bragg PG 102 with its polarization and direction of propagation substantially unaltered, and is focused or otherwise directed by the lens 304 toward the image sensor 305. As shown in the examples herein, the layers of the optical elements are configured such that "white" visible light (e.g., having wavelengths of about 400 nm to about 700 nm) will pass through the layer stack 100, 100' substantially unaffected, such that the lens 304 may also focus or otherwise direct the visible light for imaging by the image sensor 305.

Thus, in FIG. 3A, the image sensor 305 is configured to generate images based on both the non-visible light within the specified wavelength band (e.g., IR light) and the visible light. For structured light depth sensing applications, mathematical frame subtraction can be used to diminish the effect of the white visible light from the IR signal, as described in greater detail below. For time of flight depth sensing applications, the white light will essentially be a constant signal, and as such can be filtered from the IR modulated signal.

In FIG. 3B, similar to FIG. 3A, the Bragg PG 101 diffracts the LHC polarized non-visible light within the specified wavelength band (e.g., IR light) away from the lens 304/image sensor 305 (e.g., into a reflective first-order beam), and transmits the remaining RHC polarized non-visible light within the specified wavelength band to the $\lambda/2$ LC switch 103. The switchable optical layer 103 is in the "on" state (e.g., with a voltage applied thereto) such that the polarization of the RHC polarized non-visible light passing therethrough is transformed into LHC polarized non-visible light within the specified wavelength band. More particularly, the orientation of the LC molecules in the $\lambda/2$ LC cell 103 may retard the RHC polarized non-visible light by a half wavelength $\lambda/2$ (i.e., by 180°) to provide the LHC polarized non-visible light within the specified wavelength band incident on the Bragg PG 102. The Bragg PG 102 is configured to diffract the LHC polarized non-visible light within the specified wavelength band away from the lens 304/image sensor 305 (e.g., into a reflective first-order beam). The Bragg PG 102 may diffract the incident polarized beams with up to 100% efficiency, such that substantially all of the non-visible light within the specified wavelength band is directed away from the lens 304, and thus, away from the image sensor 305. Moreover, due to anti-parallel orientation relative to Bragg PG 101, the Bragg PG 102 may diffract the LHC polarized IR light away from the optical element 300, 300' entirely (e.g., at a substantially "off-Bragg" angle, that is, intentionally at an angle that is not affected by the gratings 101 and/or 102), to reduce and/or avoid further propagation within the optical element 300, 300'.

More generally, the arrangement of the first GP element or polarization grating 101, a switchable optical layer 103, and a second GP element or polarization grating 102 are configured to direct a first wavelength band of light (e.g., IR light or light otherwise outside of the visible spectrum) into different directions or angles towards or away from the image sensor, depending on the state of the switchable optical layer 103.

In some applications, surface reconstruction may be necessary in order for virtual objects to be programmed to correctly interact with the terrain, which may be referred to as coincident surface reconstruction. In telepresence applications, it can be advantageous to combine the depth sensor information with the color image of the photo-video camera, so that the image can be sent to a third party and reconstructed fully. This may be referred to as 'draping' the color image with the depth information. For example, image draping may be used in aerospace applications, whereby aerial photographs are draped over 3-D map information.

In embodiments of the present disclosure, the same optical element is used to image both the IR light and the visible light on the same image sensor. As such, the color image data (from the visible light) can be captured as part of the imaging process, and the depth information or data (from the IR light) is also coincident with the color image, i.e., there is no parallax or displacement error to consider.

Some embodiments of the present disclosure may utilize sequentially captured coincident image data for frame-to-frame image subtraction. For example, the image sensor 305 may be configured to sequentially capture combined color and depth image data (based on capturing both visible and non-visible light, as shown in FIG. 3A) and color image data (based on capturing only the visible light, as shown in FIG. 3B), e.g., in consecutive image frames. A signal processor may be configured to calculate depth image data (e.g., based on the IR or other non-visible light) by subtraction of the color image data (captured in FIG. 3B) from the combined color and depth image data (captured in FIG. 3A).

As another example, the image sensor 305 may be configured to sequentially capture combined color and depth image data (e.g., in consecutive image frames) in coordination with activation and deactivation of an illumination source that is configured to output IR or other non-visible light, for example the illumination sources 600 or 800 described below. A signal processor may be configured to calculate depth image data (e.g., based on the IR or other non-visible light) based on subtraction of combined color and depth image data of the image frames captured with the illumination source on and off, respectively.

In embodiments including multiple image sensors per pixel (e.g., red, green, and blue subpixels), the depth information may be captured by multiple subpixels (e.g., due to the IR light leakage in each of the red, green, and blue subpixels), which may provide the IR image with greater resolution than the photo-video image (due to detection of only portions of the visible light by each of the red, green, and blue subpixels).

a. Embodiments of the present disclosure may further provide optical elements that are configured to change the field of regard (e.g., field of view) of the depth sensor. In particular, while described above with reference to the depth image capture of terrain, it may be advantageous to be able to 'point' the camera in a desired direction to alter the field of view (e.g., in AR glasses, to point the depth camera image down in order to capture hand gestures). Rather than generating a much larger depth field of view to cover this, in some embodiments the field of view for IR light (or, more generally, light outside of the visible spectrum) can be biased downwards by adding one or more alternating pairs of PGs and LC switches in the layer stack of the optical element.

FIGS. 4A, 4B, and 4C illustrate a multi-spectral optical imaging detector including an arrangement of optical elements that provide an integrated depth sensor and photo-video camera with a variable field of regard in accordance with some embodiments of the present disclosure. The optical element 400, 400' includes a first polarization grating, a switchable optical layer, and a second polarization grating, implemented by a Bragg PG 101, an LC cell 103, and a Bragg PG 102, similar to the configuration discussed with reference to FIGS. 1A to 1D. The optical element 400, 400' further includes a second switchable optical layer 403 and a GP element, shown by way of example as a third polarization grating 402, which functions as a transmission grating. The polarization grating 402 may be configured to alter the direction of light within a specified wavelength band having a first polarization (e.g., LHC light) but may not alter the direction of propagation of light within the specified wavelength band having a second, different polarization (e.g. the opposite or orthogonal polarization). The lens 304, which may also be a GP element such as a geometric phase lens, is configured to focus or direct the light on an image sensor 305, illustrated by way of example rather than limitation as a CMOS image sensor. FIG. 4A illustrates the switchable optical layer 403 in a first ("off") state that does not affect the polarization of light passing therethrough, while FIG. 4B illustrates the switchable optical layer 403 in a second ("on") state that alters the polarization of the light passing within the specified wavelength band therethrough. FIG. 4C illustrates a configuration where the layers (101, 103, 102, 403, and 402, and, optionally, 304) of the optical element are sequentially stacked directly on one another to define a monolithic structure 400'; however, it will be understood that intervening layers (e.g., transparent spacer layers and/or electrode layers) may be present (e.g., between two or more of the layers) in some embodiments.

As shown in FIGS. 4A and 4B, in operation, the Bragg PGs 101 and 102 are reflection gratings, each of which are configured to block or prevent transmission of light within the specified wavelength band (e.g., non-visible light, such as IR light) from entering the camera lens 304 by diffracting the light within the specified wavelength band into different directions or angles towards or away from the image sensor 305, depending on the state of the switchable optical layer 103, as described above with reference to FIGS. 1A and 1B. The optical element further includes the second switchable optical layer 403 (e.g., a λ/2 LC switch), which does not affect the polarization of the incident light received from the Bragg PG 102 (illustrated as RHC polarized non-visible light) in the "off" state (as shown in FIG. 4A), and the third PG 402. In the "on" state (as shown in FIG. 4B), the second switchable optical layer 403 converts the incident light to the orthogonal polarization (illustrated as retarding the RHC polarized light within the specified wavelength band by a half wavelength λ/2 (i.e., by 180°) to provide the LHC polarized non-visible light within the specified wavelength band) for input to the third PG 402.

The third PG 402 is a transmission grating that is configured to diffract the field of view in one or more directions. In particular, the third PG 402 may be configured to diffract or otherwise direct one polarization of light within the specified wavelength band to the image sensor 305 in a first direction to define a first field of view, and to diffract or otherwise direct another (e.g., orthogonal) polarization of the light within the specified wavelength band to the image sensor 305 in a second, different direction (e.g., with or without substantially affecting the direction of propagation) to define a second field of view, responsive to the states of the second switchable optical layer 403, respectively.

In the examples of FIGS. 4A and 4B, the third PG 402 is configured to transmit the RHC polarized light within the specified wavelength band to define one field of view of the image sensor 305 when the second switchable element 403 is in the "off" state, and to alter the propagation direction of the LHC polarized light within the specified wavelength band (and thus, the field of view of the image sensor 305 with respect to the non-visible light within the specified wavelength band) when the second switchable element 403 is in the "on" state. In greater detail, the angular bandwidth of the transmission grating 402 may be configured to be at least as large as the field of view as the sensor lens 304. The incidence angles of the transmission grating 402 may be substantially off-axis to be either outside of the 'normal' (e.g., without optical elements as described herein) sensor field of view, or slightly overlapping the normal sensor field of view. As shown in FIG. 4B, the light from this wider field of view can be diffracted towards the optical axis of the sensor lens 304 based on or responsive to the state of the second switchable element 403. For example, in an AR glasses application, a depth image may be directed to the hands of a wearer for gesture recognition as noted above.

In some embodiments, the transmission grating 402 may be implemented as a Bragg PG. Other optical layers may also be used as the transmission grating 402, including a non-Bragg PG (such as a Raman-Nath PG) or geometric-phase hologram (GPH), including those geometric-phase surfaces or elements that may not be made from liquid crystal materials such as dielectric or plasmonic metasurfaces. Also, while illustrated as including a single switchable optical element 403 and transmission grating 402 pair, some embodiments may include multiple pairs of switchable elements 403 and transmission gratings 402 such that the depth image could be scanned around the room and increase the effective field of view of the system, such as the systems illustrated in FIGS. 7A to 10B. Likewise, while illustrated with reference to operations for altering the field of view in one dimension (e.g., the azimuth or horizontal dimension), it will be understood that embodiments described herein may be similarly used to alter the field of view in another dimension (e.g., the elevation or vertical dimension), and/or in multiple dimensions (e.g., by using multiple pairs of switchable elements 403 and transmission gratings 402, each configured to alter the field of view in a respective dimension).

Embodiments of the present disclosure may provide significant advantages over some conventional arrangements. For example, wavelength selective diffractive elements (such as GP elements, including BPGs) as described herein may be configured to allow propagation of visible light to be substantially unaffected by the optical shutter element, and may thus maintain high transmittance (e.g., approximately or up to 100%, due to the high diffraction efficiency of the GP elements), in contrast to some conventional arrangements. In addition, some reflective BPG arrangements as described herein may eliminate the need for light blocking features or elements to prevent light of the undesired polarization and/or wavelength bands from reaching the camera, and may not require unpolarized input light. Also, as described herein, frame-to-frame subtraction may be used to determine or isolate the signal within the specified wavelength band (e.g., the IR signal), which may be more robust and may provide improved contrast, particularly in IR signal detection applications (as compared with some conventional arrangements that may rely on IR signal blocking).

FIGS. 5A, 5B, and 5C illustrate a multi-spectral optical imaging detector including an arrangement of optical elements that provide a variable field of regard (independent of combined photo/video and depth image sensor applications) in accordance with some embodiments of the present disclosure. The optical element 500, 500' includes the switchable optical layer 403 and the polarization grating (or geometric phase hologram) 402 which functions as a transmission grating, similar to as discussed above with reference to FIGS. 4A to 4C. The optical element 500, 500' further includes a polarizer element 401-1 and a retarder element (illustrated as a quarterwave (λ/4) retarder) 401-2 positioned to receive the unpolarized incident light and provide polarized light of a desired polarization (illustrated with reference to linearly polarized light) incident on the switchable optical layer 403. Although illustrated as between the polarizer 401-1 and the switchable optical layer 403, the retarder element 401-2 may be provided between the switchable optical layer 403 and the PG 402 in some embodiments. The lens 304, which may also be a GP element such as a geometric phase lens, is configured to focus or direct the light on an image sensor 305, illustrated by way of example rather than limitation as a CMOS image sensor.

FIG. 5A illustrates the switchable optical layer 403 in a first ("off") state that does not substantially affect the polarization of light passing therethrough, while FIG. 5B illustrates the switchable optical layer 403 in a second ("on") state that alters the polarization of the light passing therethrough. FIG. 5C illustrates a configuration where the layers (401-1, 401-2, 403, and 402, and, optionally, 304) of the optical element are sequentially stacked directly on one another to define a monolithic structure 500'; however, it will be understood that intervening layers (e.g., transparent spacer layers and/or electrode layers) may be present (e.g., between two or more of the layers) in some embodiments.

As shown in FIGS. 5A and 5B, in operation, the polarizer 401-1 and retarder element 401-2 function to precondition the light for the switchable optical layer 403 and transmission grating 402 to facilitate the switching of the field of regard. As similarly discussed with reference to FIG. 4A, the switchable optical layer 403 (e.g., a λ/2 LC switch) does not affect the polarization of the incident light received from the retarder 401-2 (illustrated as RHC polarized light within the specified wavelength range; here, non-visible (e.g., IR) light) in the "off" state (as shown in FIG. 5A), and the transmission grating 402 diffracts or otherwise directs the RHC polarized light within the specified wavelength band to the lens 304 towards the image sensor 305 in a first direction to define a first field of view responsive to the "off" state of the switchable optical layer 403.

In the "on" state (as shown in FIG. 5B), the switchable optical layer 403 converts the incident light to the orthogonal polarization (illustrated as retarding the RHC polarized light by λ/2 (i.e., by 180°)) to provide the LHC polarized light within the specified wavelength range, which is diffracted by transmission grating 402 (which, as noted above, may be implemented by a GP element or a PG, such as a Bragg PG) to alter the propagation direction of the LHC polarized light within the specified wavelength band towards the image sensor 305 in a second, different direction to define a second field of view responsive to the "on" state of the switchable optical layer 403. While not specifically illustrated, one or more additional pairs of diffractive layers 402 and switchable optical layers 403 may be included in the optical element 500, 500' and similarly operated to provide respective fields of view that differ from the first and second fields of view. The embodiments of FIGS. 5A and 5B can thus be used to increase the effective field of regard (collectively defined by the respective fields of view) of any image sensor, including (but not limited to) head tracking sensors.

Some embodiments of the present disclosure can provide a switchable 'window' in front of a camera. The switchable window could be used, for example, to reduce the damage of in-band laser light, for example, with respect to the wearer's eyes (in a glasses application) or other sensors. Such a switchable window as described herein need not be binary, in that the LC switch does not have to switch entirely from one polarization state to the orthogonal state, and as such, can be used to modulate the optical signal passing through.

It will be understood that, while described herein with reference to operation based on RHC polarized light and non-visible (e.g., IR) wavelength bands, embodiments of the present disclosure are not limited to operation based on any particular polarization state or wavelength band. For example, the layers and/or elements described herein can be configured and arranged so that the polarization states of the light being diffracted by any of the PGs described herein could be the orthogonal polarization state, and the LC switches can be configured and arranged accordingly to diffract light of a desired spectral range toward or away from an image sensor. For example, in FIGS. 3A and 3B, the Bragg PG 102 could be configured to operate responsive to LHC polarized light, such that the optical element/stack would reflect/diffract the LHC polarized IR light away from the image sensor 305 until the LC switch 103 is transitioned to the "on" state.

Further embodiments of the present disclosure are illustrated with reference to the systems of FIGS. 6A to 10B. While these systems are illustrated with reference to AR applications, it will be understood that embodiments of the present disclosure are in no way limited to such applications, and may be used in various other applications, including but not limited to autonomous vehicles or drones.

Figure 6A:
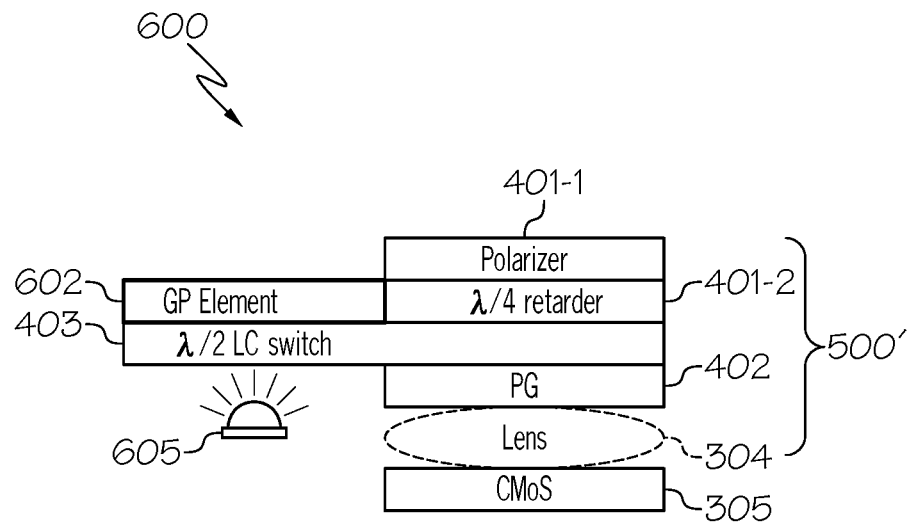
FIGS. 6A and 6B are schematic diagrams illustrating arrangement of layers in optical elements that provides an integrated illumination source, depth sensor, and photo-video camera with a variable field of regard according to some embodiments of the present disclosure.
Figure 6B:
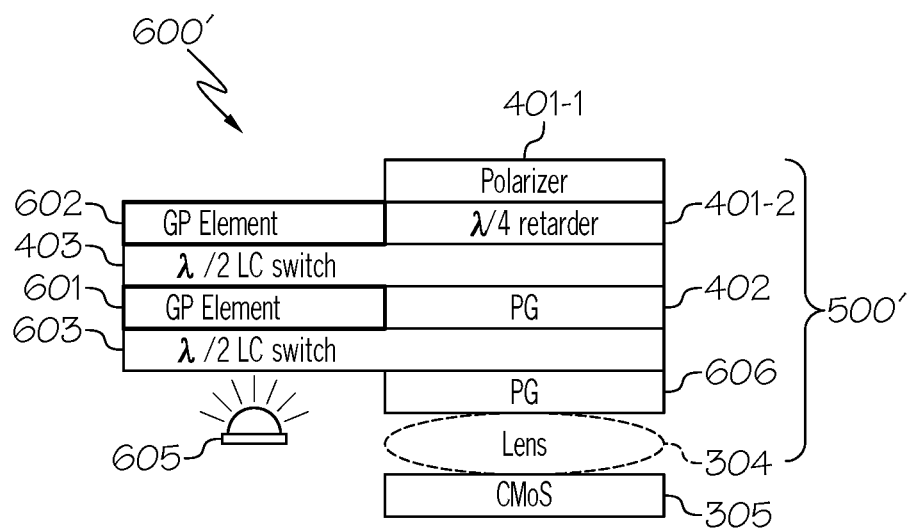

FIGS. 6A and 6B illustrate arrangement of layers in optical elements 600, 600' that provide an integrated light source, depth sensor, and photo-video camera with a variable field of regard according to some embodiments of the present disclosure. For example, the optical elements 600, 600' of FIG. 6A or 6B may be implemented to provide integration of a camera and time of flight depth sensor in a pair of AR glasses.

As shown in FIG. 6A, the optical element 600 includes a polarizer element 401-1, a retarder element 401-2 (e.g., a λ/4 retarder) positioned to receive the unpolarized incident light and provide polarized light of a desired polarization incident on a switchable optical layer 403 (e.g., a λ/2 LC switch), a polarization grating (or geometric phase hologram) 402 that functions as a transmission grating, and a lens 304 configured to focus the light on an image sensor 305 (illustrated by way of example rather than limitation as a CMOS image sensor), similar to the embodiments 500, 500' discussed above with reference to FIGS. 5A to 5C. The optical element further includes a light source 605 (for example, configured to emit light beyond the visible wavelength range, e.g., an IR light source) and a GP element or polarization grating 602 positioned to receive the light emitted from the light source after passing through the LC switch 403. The GP element 602 may have a general phase profile, or may be a polarization grating having linear phase profile (for example, a Bragg PG), or may be a series of GP elements such as a stack of PGs. In time of flight depth sensor applications, the light source 605 and sensor 305 may be positioned on the same side of a pair of AR glasses (for example, the AR glasses shown in FIGS. 7A and 7B) to reduce or minimize the electrical integration.

In the example system of FIG. 6A, the integrated light source and camera 600 utilizes the same LC switch 403 that is used to alter the field of view of the image sensor 305 (as shown in FIGS. 5A and 5B) to also change the polarization of the light emitted from the light source 605. As such, depending on the state of the shared LC switch 403 (which, in the "on" state, alters the polarization of the light emission from the light source), the GP element 602 either directs the light emission into a first direction (or to pass through unaltered) or redirects the light emission into a second direction (depending on its polarization), while also controlling redirection of the return light to the image sensor 305. That is, the combination of the LC switch 403 and the GP element 602 can alter the field of illumination of the light source 605 in synchronization with the field of view of the image sensor 305 based on the state of the optical layer 403.

Figure 7A:
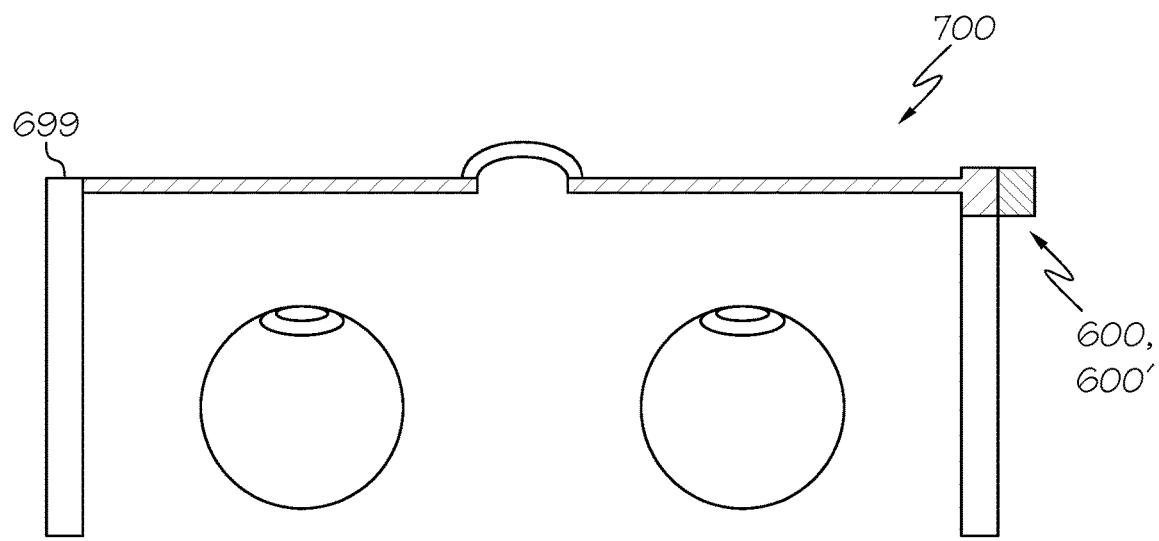
FIGS. 7A and 7B are schematic diagrams illustrating an example system that is configured for variable field of regard applications according to some embodiments of the present disclosure.
Figure 7B:
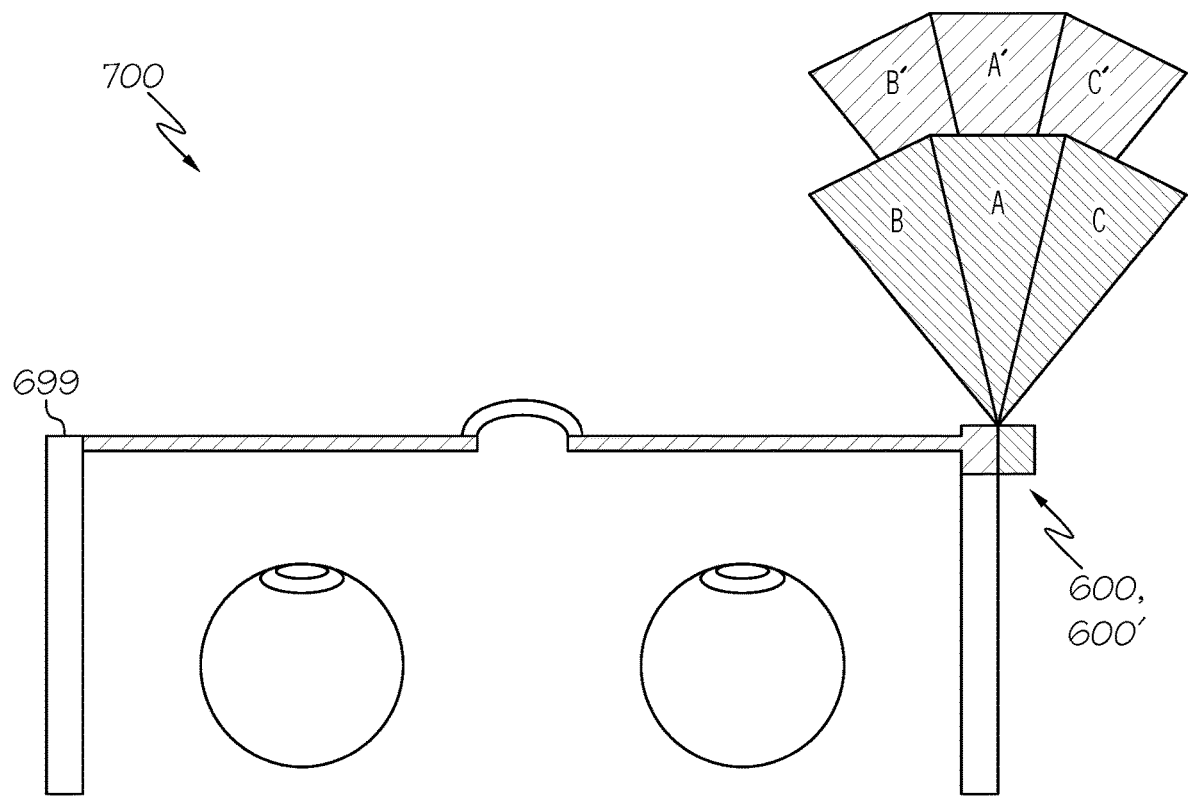

It will be understood that additional switchable optical layer and GP element pairs may be stacked on the illustrated layers to control the propagation of light emission into different directions/angles, and thus, allow for switching between multiple fields of illumination and/or fields of view (illustrated by way of example as 3 fields of illumination and 3 fields of view in FIG. 7B) depending on the state of the respective switchable optical layer 403. For example, FIG. 6B illustrates an integrated light source and camera 600' including an additional pair of elements (in particular, a GP or PG element 601 and a LC switch 603) positioned between the light source 605 and the LC switch 403 and the GP element 602, to provide additional fields of illumination responsive to the states of the LC switches 403 and 603. An additional pair of elements (in particular, a GP or PG element 606 and the same LC switch 603) are positioned between the image sensor 305 and the PG 402, to provide additional fields of view responsive to the states of the LC switches 403 and 603. In the integrated light source and camera 600' of FIG. 6B, diffractive elements 601 and 606 may be configured to generate coincident or corresponding fields of illumination and fields of view, and diffractive elements 602 and 402 may be configured to generate coincident or corresponding fields of illumination and fields of view.

In some embodiments, one or more of the GP elements 602 or 601 could also incorporate lens power (e.g., the GP element may have a non-linear phase profile) to shape the light from the light source into any desirable pattern (e.g., spread the light into the field of view of the sensor). Also, masking or a light block (e.g., element 204 of FIGS. 2A and 2B) may be employed to reduce or prevent light emission from being reflected back to the image sensor 305. In some embodiments, such a mask or light block may be implemented as a separate window at the exit of the light source, which may also prevent fingerprints contaminating the shared LC switch 403.

FIGS. 7A and 7B illustrate an example system 700 that is configured for variable field of regard applications, such as time of flight depth sensor applications, according to some embodiments of the present disclosure. In particular, FIGS. 7A and 7B illustrate an implementation of the integrated light source and camera 600, 600' of FIG. 6A or 6B in a frame or form factor 699 defining pair of AR glasses. As shown in FIG. 7B, the light emitted from the light source 605 of the optical element 600, 600' can be directed over multiple different fields of illumination in accordance with embodiments of the present disclosure, illustrated as A, B, and C. The fields of view of the return or reflected light as directed to the image sensor 305 by the optical elements 600, 600' of FIG. 7B are illustrated as A', B', and C'. As shown in FIG. 7B, as the same switchable optical layer(s) 403 and/or 603 controls the field of view of the light source 605 and the image sensor 305, operation of both are synchronized or coordinated such that the field of illumination by the light emitted from the light source 605 corresponds to the field of view detected by the image sensor 305 based on the state of the LC switches 403 and/or 603. For example, in the configuration of FIGS. 7A-7B, the field of illumination A (and the corresponding field of view A') may be controlled when the LC switch 403 is in the "off" state, and either the field of illumination B (and the corresponding field of view B') or the field of illumination C (and the corresponding field of view C') may be controlled when the LC switch 403 is in the "on" state. As noted, additional switchable optical layer and GP element pairs may be stacked to allow switching between additional fields of illumination/fields of view, in one or more dimensions (e.g., azimuth and elevation).

Figure 8:
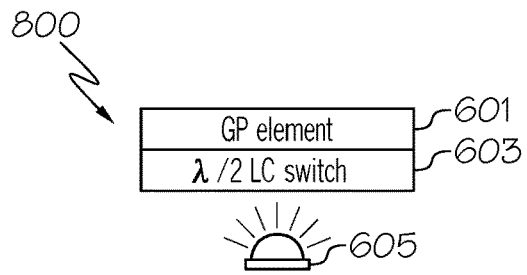
FIG. 8 is a schematic diagram illustrating arrangement of layers in an optical element that provides an illumination source with a variable field of illumination according to some embodiments of the present disclosure.
Figure 9A:
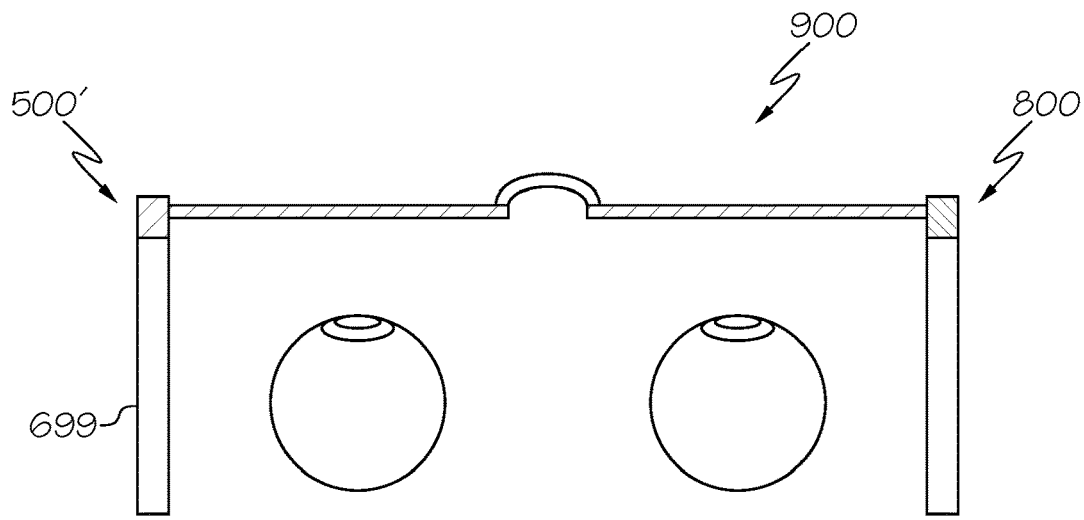
FIGS. 9A and 9B are schematic diagrams illustrating an example system that is configured for structured light depth sensor applications according to some embodiments of the present disclosure.
Figure 9B:
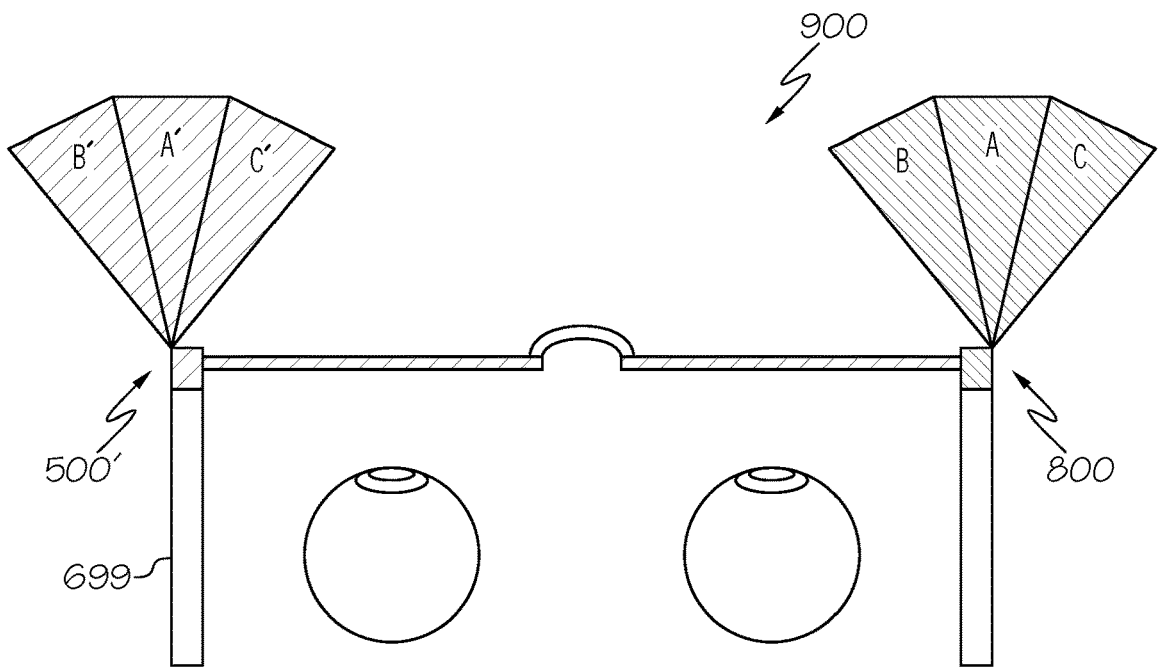

FIG. 8 is a schematic diagram illustrating arrangement of layers in an optical element 800 that provides an illumination source with a variable field of illumination according to some embodiments of the present disclosure. FIGS. 9A and 9B illustrate an example system 900 that is configured for structured light depth sensor applications according to some embodiments of the present disclosure. In the example of FIGS. 9A and 9B, the optical elements described herein provide integration of a camera and a structured light depth sensor in a pair of AR glasses.

As shown in FIGS. 9A and 9B, the system 900 includes an optical element/sensor 500' (as discussed above with reference to FIGS. 5A and 5B), with the optical element/sensor 500' positioned on one side of the AR glasses frame 699. The system 900 further includes an optical element/ illumination source 800 positioned on an opposite side of the AR glasses frame 699.

As shown in FIG. 8, the optical element/illumination source 800 includes a light source 605 that is configured to emit light that is outside the visible wavelength range (e.g., an IR light source). The optical element 800 may output the light with a structured light pattern, and may include one or more pairs of a switchable optical layer 603 (which is configured to be switched between on and off states to alter a polarization of the light emission), and a GP element or polarization grating 601 (which is configured to differently alter the polarization and/or propagation direction of the light emission from the light source 605 (which may be dependent on the state of the switchable optical layer 603). The light source 605, switchable layer 603, and GP element 601 of the optical element/illumination source 800 may be positioned so as to be spaced apart from the optical element/ sensor 500' (e.g., on opposite side of the AR glasses frame 699). The GP element 601 may have a general phase profile, or may be a polarization grating having linear phase profile (for example, a Bragg PG), or may be a series of GP elements such as a stack of PGs.

In structured light applications, the distance or spacing between the light source 605 and the image sensor 305 introduces parallax of the return signal, which may be necessary to observe depth (i.e., the light source 605 and image sensor 305 may not be positioned coaxially in a structured light depth sensor). More generally, in structured light applications, separation between the light source 605/ emitter 800 and the image sensor 305/detector 500' may be advantageous for detection of parallax; however, it will be understood that such separation need not be on extreme ends of the system (e.g., on opposite sides or ends of the AR glasses frame 699, as shown in FIGS. 9A and 9B), but rather may be more modestly separated on the same side of a system or otherwise in closer proximity.

In particular, in the example system 900 of FIGS. 9A-9B, the state of the LC switch 603 of the optical element/ illumination source 800 is controlled to be synchronized with the LC switch 403 of the optical element/sensor 500', such that the respective fields of illumination (A, B, C) of the optical element/illumination source 800 correspond to the respective fields of view (A', B', C') of the optical element/ sensor 500'. In some embodiments, a single field of illumination and field of view may be used. In other embodiments, multiple pairs of LC switch and GP element layers may be stacked to provide switching between multiple light source fields of illumination and corresponding sensor fields of view (illustrated as 3 fields of illumination/fields of view in the example of FIG. 9B) depending on the state of the respective LC switches (e.g., 603, 403), effectively allowing for "scanning" of the sensor 500' and illumination source 800 to increase the coverage area.

In some embodiments, one or more of the GP element(s) of the illumination source 800 may incorporate lens power (e.g., the GP element 601 may have a non-linear phase profile with respective optical axis orientations that vary non-linearly) to shape the light from the light source 605 into any desirable pattern (e.g., spread the light into the field of view of the sensor). In some embodiments, the GP element 601 may incorporate a diffraction grating (e.g., may have a linear phase profile with respective optical axis orientations that vary linearly) that is configured to provide the light emission in a structured pattern, e.g., such that the light incident on an object in the forward terrain is illuminated with a series of dots or lines or any shape that could be processed from the sensor image such that depth can be determined.

Also, the optical element/illumination source 800 may include further pair(s) of LC switches and GP elements that are configured to provide a second, different diffraction pattern. For instance, the light emission from the light source 605 may be diffracted with a first diffraction pattern to provide a first pattern of illumination with a series of dots, and a second diffraction pattern to provide a second pattern of illumination with a similar series of dots that fill in the gaps of the first pattern, e.g., in an alternating manner. Such multiple illumination patterns may allow a high-resolution depth image to be achieved between first and second images, while allowing processing algorithms or circuits to more easily discriminate the features (e.g., dots) in the respective illumination patterns (e.g., to distinguish a singular more sparse pattern from a denser pattern). Benefits of such an implementation may include the relatively low cost of a low resolution camera, and the relatively small size of the camera and lens. For example, if a photo video camera is not used, the resolution of the camera may be less important. That is, embodiments of the present disclosure may be configured to change the emission of the structured light pattern to intersperse a first pattern of illumination with a second pattern of illumination to increase the resolution of the images capturing the respective patterns, while reducing ambiguity in correlating the patterns (as compared to higher-resolution images or patterns).

In further embodiments of the present disclosure, the sensor image could be used for SLAM tracking as well as depth sensing. For example, instead of using the further pair(s) of LC switches and GP elements (described above) to provide a second diffraction pattern, the further pair(s) of LC switches and GP elements may provide a plane illumination pattern (e.g., a non-structured illumination pattern that uniformly illuminates the terrain with IR light). The resultant image may provide a grey scale image that may be used by SLAM processing algorithms or circuits to detect changes in textures and features of the captured image between sequential image frames. That is, embodiments of the present disclosure may be configured to change the light emission from a uniform pattern to a structured pattern (or vice versa) using the switching configurations described herein, such that functions of a structured light sensor may be combined with SLAM head tracking. More generally, integration of more than two types of cameras/sensors (e.g., integration of a photo-video camera, depth sensor, and SLAM camera) may be achieved by embodiments of the present disclosure.

Still referring to FIGS. 9A-9B, the light emitted from the optical element/illumination source 800 over three different fields of illumination is illustrated as A, B, and C. The fields of view of the return or reflected light as directed to the image sensor 305 by the optical element/sensor 500' are illustrated as A', B', and C'. As shown in FIG. 9B, by coordinating operation of the respective LC switches 603 and 403 in the illumination source/emitter 800 and sensor/detector 500', respectively, pairs of corresponding emitter fields of illumination/detector fields of view A/A', B/B', and C/C' are generated based on the respective states of the LC switches 603 and 403 in the illumination source stack 601, 603 and sensor stack 401-1, 401-2, 403, 402. As noted, additional pairs of switchable optical layers and GP elements may be stacked to allow switching between more than two fields of illumination/fields of view, in one or more dimensions (e.g., azimuth and elevation). In some embodiments, the total field of illumination/view could be extremely large, e.g. 120 degrees azimuth and elevation. Larger fields of illumination/view may have limitations due to the oblique angle limiting the entrance pupil of the camera (affecting how much light is captured, i.e., increasing the effective f-number of the system).

Figure 10A:
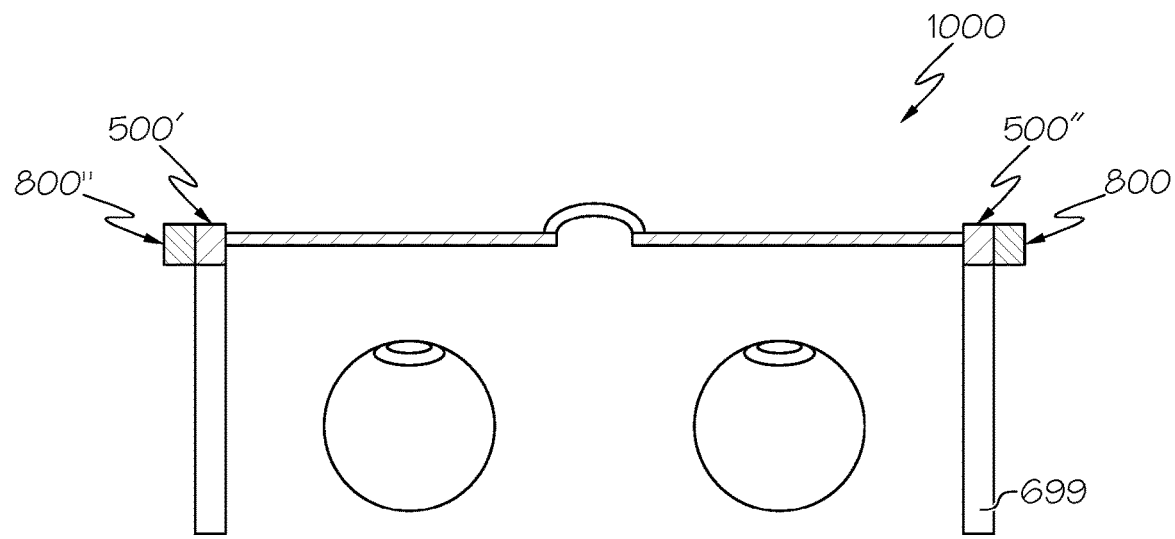
FIGS. 10A and 10B are schematic diagrams illustrating an example system that is configured for stereo camera based depth sensor applications according to some embodiments of the present disclosure.
Figure 10B:
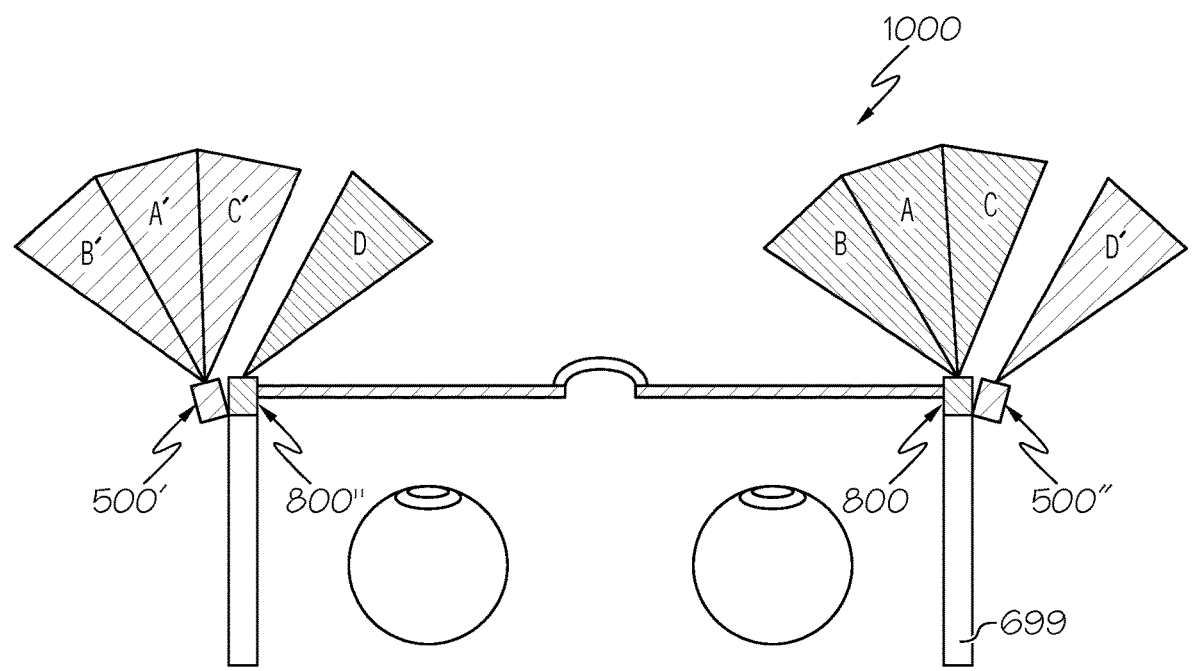

FIGS. 10A and 10B illustrate example systems 1000, 1000' that are configured for stereo camera based depth sensor applications according to some embodiments of the present disclosure. In the example of FIGS. 10A and 10B, the optical elements 500', 800 described herein provide integration of stereo cameras and structured light depth sensors in a pair of AR glasses. The system 1000 includes a first illumination source 800 and sensor 500' pair (also referred to as 800/500'), each on opposite sides or ends of the AR glasses frame 699 (as in FIGS. 9A and 9B), in combination with a second illumination source 800" and sensor 500" pair (also referred to as 800"/500"), each on the opposite sides or ends of the AR glasses frame 699. In other words, the systems o1000, 1000' f FIGS. 10A and 10B includes two illumination sources 800, 800' and two cameras 500', 500" joined in pairs, where the first illumination source 800 is on the same side as the second sensor 500", and the second illumination source 800" is on the same side as the first sensor 500'. Each optical element/sensor 500, 500' may operate as discussed above with reference to FIGS. 5A to 5C. Each illumination source 800, 800" may be configured emit light that is outside the visible wavelength range (e.g., an IR light source) with a structured light pattern, and may include one or more pairs of a switchable optical layer 603 that is configured to be switched between on and off states to alter a polarization of the light emission, and a GP element 601 that is configured to differently alter the polarization and/or propagation direction of the light emission (e.g., depending on the state of the switchable optical layer 603), as similarly discussed above with reference to FIG. 8. The light source 605, switchable layer 603, and GP element 601 of each illumination source 800, 800" is positioned so as to be spaced apart from its paired optical element/sensor 500', 500" (e.g., on opposite sides of the AR glasses frame 699). The spacing or distance between the each illumination source 800, 800" and its paired optical element/sensor 500', 500" may be sufficient to introduce parallax therebetween.

In FIG. 10A, the forward viewing optical element/sensors 500, 500' can be used to provide depth information using stereo vision. That is, passive depth information can be achieved using stereo camera-based techniques. The number of LC switch and GP element pairs of the optical elements 800, 800", 500'500" can be the same on each side or end of the frame 900, and may be reduced in number per side based on the collective combination of angles and switching pairs, e.g., as shown in FIG. 10B. In particular, FIG. 10B illustrates the light emitted from two illumination sources/emitters 800, 800" over four different fields of illumination in accordance with embodiments of the present disclosure, illustrated as A, B, C, and D. The fields of view of the return or reflected light as directed to the respective image sensors 305 of the detectors 500', 500" are illustrated as A', B', C', and D'. As shown in FIG. 10B, first pairs of emitter fields of illumination/detector fields of view A/A', B/B', and C/C' are generated by a first pair of illumination sources and sensors 800 and 500' on opposite sides of the AR glasses frame 699, and a second pair of emitter field of illumination/detector field of view D/D' is generated by a second pair of illumination sources and sensors 800" and 500" on opposite sides of the AR glasses frame 699.

In the example system 1000' of FIG. 10B, the first and second detectors 500', 500" are angled outwards (i.e., towards the periphery of the AR glasses frame 699), so as to collectively define a wider total field of view A', B', C', D', increasing the coverage of the system. Such increased coverage may be of value in SLAM tracking applications, e.g., to capture a larger image or otherwise greater portion of the terrain to improve frame-to-frame correlation for continuous tracking. In this example, the first and second illumination sources 800, 800" are angled inwards (i.e., toward the center of the AR glasses frame 699) to collectively define the fields of illumination A, B, C, D that support or correspond to the fields of view of the first and second detectors 500', 500".

When the fields of view of the detectors 500', 500" are set in the forward direction (e.g., as shown in the example system 1000 of FIG. 10A) the field of view of the first (e.g., left) detector 500' can be overlapped with the field of view of the second (e.g., right) detector 500" so additional depth information can be achieved using parallax of objects between the images captured by the first and second detectors 500' 500". For this function, light emission provided by the first and/or second illumination sources 800, 800" may not be required; however, if light emission from the first and/or second illumination sources 800, 800" is used, the respective patterns of emission provided by the first and/or second illumination sources 800, 800" may be substantially uniform (rather than structured light patterns) such that the images captured by the first and second detectors 500', 500" are grey scale or otherwise indicate textures of the objects in view.

Further advantages of optical elements that can provide combined depth and photo-video cameras as described herein may include the ability to calibrate using an external calibration reference. The camera can be calibrated for angle versus pixel so depth of a known test pattern can be calculated using the angle subtense of the target at the sensor and simple geometry. The parallax of the structured light pattern can be captured and the depth estimation can be compared between the two calculations. In embodiments including stereo cameras, the depth determined from stereo parallax can also be compared with the depth determined from the structured light parallax.

Although illustrated in the example systems of FIGS. 6A to 10B with reference to an element stack including a light source 605, switchable optical layer 603, and GP element 601, it will be understood that intervening elements, such as additional polarizers, retarders, and/or other optical layers, may also be present. For example, depending on the characteristics of the GP element 601, a particular polarization of the light emission may be needed to provide the desired diffraction angles. As such, if the light source 605 emits polarized light (e.g., where the light source 605 is a laser or other polarized light source), a waveplate (e.g., a quarter waveplate to provide circular polarization) may be included between the light source 605 and the switchable optical layer 603 to provide the light emission with the desired input polarization. Likewise, if the light source 605 does not emit polarized light (e.g., where the light source 605 is an LED or other unpolarized light source), a polarizer may be included between the light source 605 and the switchable optical layer 603 to provide the light emission with the desired input polarization.

Embodiments of the present disclosure have been described with reference to diffractive optical elements such as polarization gratings. PGs are diffractive optical elements formed by patterning thin films with optical anisotropy. More specifically, a PG has a local optical axis that varies linearly (e.g., $\varphi(x)=\pi x/\Lambda$) along at least one direction that is coplanar with the optical axis itself (e.g., the X-Y plane), and has a homogenous anisotropy magnitude, among other features. PGs may provide high diffraction efficiency, limited diffraction orders, and/or polarization selectivity. Using photo-alignment and liquid crystal (LC) materials, PGs may be fabricated with high quality, in both switchable and polymerizable LCs. In the latter case, PGs may be formed as multiple sublayers of LCs with a single alignment layer. By adding chiral dopants to reactive mesogens, also called low-molecular weight polymerizable LCs (LCPs), a chiral twist in each layer may be achieved. This chiral twist can be used to tailor the bandwidth of high diffraction efficiency.

The interaction of light with diffraction gratings can be affected by a complex combination of both material and geometric parameters. It may be common in the field of diffraction gratings to use a dimensionless parameter Q to identify the regime of the optical behavior of a particular grating configuration:

$$Q=2\pi\lambda d/\Lambda^2 n$$

where $\lambda$ is the vacuum wavelength of light, d is the grating thickness, $\Lambda$ is the grating period of the optical element (i.e., pitch), and n is the average refractive index. In this framework, the Bragg regime can be defined as Q>1, the Raman-Nath regime can be defined as Q<1, and Q~1 may refer to a mixed regime with properties of both.

Embodiments described herein provide PGs with both large diffraction angles θ of up to about 900 (i.e., $\lambda$ approaching $\Lambda$) and high efficiency. Bragg PGs may be formed with materials (such as LC materials) having grating period $\Lambda$, thickness d, and/or average refractive index n selected such that the Bragg condition (Q>1) is attained for the wavelength of operation may make this possible. Bragg PGs refer to polarization gratings that operate in the Bragg regime, which have higher diffraction efficiency (in comparison to some non-Bragg PGs) and are designed to operate in a single diffraction order (rather than multiple diffraction orders of some non-Bragg PGs). The Bragg PG(s) may be configured to diffract light within the specified wavelengths of operation into in directions greater than about 45° from each other, greater than about 60° from each other, or up to approximately 90° from each other, also referred to herein as angular separation. More specifically, embodiments of the present invention can employ multiple stacked birefringent sublayers (which may have respective thicknesses that are less than the operational wavelength of the light to be passed therethrough), individually coated and polymerized, to achieve the large thicknesses required for the Bragg regime.

In some embodiments, Bragg PGs may be formed using bulk nematic LC layers, which can be described as polymerized reactive LC monomer layers, or LC polymer (LCP) layers. LCP layers are distinct from conventional liquid crystalline polymers. The LCP thin films employed in some embodiments of the present invention include low-molecular-weight reactive LC molecules, which are aligned by characteristics of the surface on which they are coated or otherwise formed, and are subsequently polymerized into a rigid polymer network to fix the optical axis orientations in accordance with the alignment. In particular, the periodic pattern of the Bragg PG can be recorded into the surface of a photoalignment layer, rather than the LCP layer directly. Conversely, some conventional liquid crystalline polymers may be high-molecular-weight polymers with liquid crystalline components, and the periodic pattern of the Bragg PG is typically directly recorded into the material, for instance, via photoinduced molecular realignment.

A geometric phase (GP) element is a diffractive anisotropic optical element having optical axis orientations that vary in one or more dimensions and/or in any manner, including but not limited to linear, nonlinear, and continuous or discontinuous optical axis variations, thereby affecting the polarization of incident light in such a way as to control the geometric phase (or Pancharatnam-Berry phase, which results from a change in polarization states), rather than the dynamic phase (which results from optical path length difference effects).

A GP element can be considered a more complex version of a polarization grating, having a one- or two-dimensional variation of its grating period $\Lambda$ along a surface thereof. From another point of view, a PG can be considered as merely a particular example of a GPH, implementing a linear phase profile, e.g., $\varphi(x)=\pi x/\Lambda$ or $\varphi(x)=\pi y/\Lambda$, where $\Lambda$ is the constant grating period. In some embodiments, a non-linear variation of the local optical axis orientations (e.g., $\varphi(x)=k\pi x^2$) in one or more dimensions as a function of position along the surface of the geometric phase element may define a pattern having a continuously varying periodicity, such that the overall effect of the GP element may be to provide a lens effect.

In some instances, the varying optical axis orientations may be generated by patterning a recording medium or other alignment surface using holography techniques, in which case the GP element may be referred to as a geometric phase hologram (GPH) element, or simply a GPH. However, geometric phase elements as described herein can also be created by various methods, including holographic interference and various other forms of lithography, and thus, a 'hologram' as described herein is not limited to creation by holographic interference, or 'holography'.

Embodiments of the present invention are described herein with reference to liquid crystal (LC) materials. As used herein, the liquid crystals can have a nematic phase, a chiral nematic phase, a smectic phase, a ferroelectric phase, and/or another phase. In addition, a number of photopolymerizable polymers may be used as alignment layers to create the GP elements described herein.

It will be understood that, as used herein, the terminology "retarder" and "waveplate" may be used interchangeably, and the following additional terms are also to be considered equivalent, unless otherwise indicated: any "retardation plate," "compensation film," and "birefringent plate" that is uniaxial, biaxial, or inhomogeneous. Retarders as described herein may be broadband (i.e., achromatic) or narrowband (i.e., chromatic). Retarders as described herein may therefore accomplish a polarization change via optical rotation or birefringence retardation, or any combination thereof. In some embodiments, the retarders described herein may not significantly affect or alter the direction of propagation of light passing therethrough. In some embodiments, the retarders described herein may respond to an applied electrical voltage.

It will be understood that, as used herein, a "transmissive" or "transparent" substrate or element may allow at least some of the incident light to pass therethrough. In other words, transmissive or transparent elements described herein need not be perfectly transparent, and may have isotropic or dichroic absorption characteristics and/or may otherwise absorb some of the incident light. A transparent substrate or spacer may be a glass substrate in some embodiments. In contrast, a "reflective" substrate as described herein may reflect at least some of the incident light.

It will also be understood that anti-reflection coatings may be applied on all surfaces that interface with the ambient medium (e.g., air). It will also be understood that the optical elements/layers described herein may in some cases be laminated together to define a monolithic structure without an air gap in between the elements/layers, and in other cases may be arranged with an air gap in between.

As used herein, "zero-order" light may propagate at angles substantially equal or opposite to the angle of incidence of the incident light. In contrast, "non-zero-order light," such as "first-order" light, may propagate at angles that differ from the angle of incidence of (e.g., in directions that are not parallel to) the incident light. "Partially collimated" light, as described herein, may describe light rays or beams that propagate substantially parallel to one another, but may have some divergence (e.g., difference in beam diameter with distance from the source).

As used herein, a "parallel" polarization grating arrangement includes first and second polarization gratings with the same birefringence n(x), i.e., the respective birefringence patterns of the first and second polarization gratings have substantially similar orientations. In contrast, an "antiparallel" polarization grating arrangement includes first and second polarization gratings having opposite birefringence, i.e., n(x) and n(−x). In other words, the second polarization grating has a birefringence pattern that is inverted or rotated by about 180 degrees relative to that of the first polarization grating.

Embodiments of the present invention are described herein with reference to liquid crystal (LC) materials. Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties. As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a controllable way.

Also, "polymerizable liquid crystals" may refer to relatively low-molecular weight liquid crystal materials that can be polymerized, and may also be described herein as "reactive mesogens." In contrast, "non-reactive liquid crystals" may refer to relatively low-molecular weight liquid crystal materials that may not be polymerized. However, it will be understood that embodiments of the present invention are not limited to the particular materials described herein, but may be implemented using any and all material layers that function as described herein.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as, illustrated in the figures. It will be understood that the spatially relative terms are intended, to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the present invention being set forth in the following claims.

That which is claimed:

1. A multi-spectral optical imaging device, comprising:
   a switchable element configured to be switched between first and second states, wherein one of the first and second states alters a polarization of light; and
   a geometric phase element arranged to receive the light from the switchable element, wherein the geometric phase element is configured to diffract a first wavelength band of the light to alter a direction of propagation thereof based on the polarization and without substantially altering a direction of propagation of a second wavelength band of the light, responsive to the first state of the switchable element.

2. The multi-spectral optical imaging device of claim 1, wherein the geometric phase element is configured to simultaneously transmit the first and second wavelength bands of the light without substantially altering the directions of propagation thereof, responsive to the second state of the switchable element.

3. The multi-spectral optical imaging device of claim 2, wherein, independent of the first and second states of the switchable element, the geometric phase element is configured to transmit the second wavelength band of the light without substantially altering the direction of propagation and the polarization thereof.

4. The multi-spectral optical imaging device of claim 2, further comprising:
   at least one optical element arranged to provide the light to the switchable element such that the first wavelength band of the light comprises a second polarization that is orthogonal to a first polarization,
   wherein the geometric phase element is configured to diffract the first polarization of the first wavelength band of the light to alter the direction of propagation thereof responsive to the first state of the switchable element, and
   wherein the geometric phase element is configured to simultaneously transmit the second wavelength band and the second polarization of the first wavelength band of the light without substantially altering the directions of propagation thereof responsive to the second state of the switchable element.

5. The multi-spectral optical imaging device of claim 4, wherein:
   the geometric phase element is a second geometric phase element; and
   the at least one optical element is a first geometric phase element that is arranged receive unpolarized light comprising the first and second wavelength bands,
   wherein the first geometric phase element is configured to diffract the first polarization of the first wavelength band away from the switchable element and to simultaneously transmit the second wavelength band and the second polarization of the first wavelength band to the switchable element without substantially altering the directions of propagation thereof.

6. The multi-spectral optical imaging device of claim 5, wherein the first and/or second geometric phase element is a Bragg polarization grating.

7. The multi-spectral optical imaging device of claim 6, wherein the Bragg polarization grating is configured to diffract the first polarization of the first wavelength band into a reflective first-order direction, and to transmit the second polarization of the first wavelength band into a zero-order direction.

8. The multi-spectral optical imaging device of claim 4, further comprising:
   a camera arranged to receive the light from the geometric phase element, the camera comprising an image sensor that is configured to detect the first and second wavelength bands of the light.

9. The multi-spectral optical imaging device of claim 8, wherein the image sensor is configured to capture first and second image data responsive to the first and second states of the switchable element, respectively, and further comprising:
   a signal processor configured to calculate image data for the first wavelength band of the light based on subtraction of the first and second image data.

10. The multi-spectral optical imaging device of claim 8, wherein the image sensor is configured to capture second and third image data responsive to activation and deactivation of an illumination source, respectively, during sequential operations of the switchable element in the second state, wherein the illumination source is configured to output light emission comprising the first wavelength band, and further comprising:
    a signal processor configured to calculate image data for the first wavelength band of the light based on subtraction of the second and third image data.

11. The multi-spectral optical imaging device of claim 8, wherein the switchable element is a first switchable element and the geometric phase element is a first geometric phase element, and further comprising:
    a second switchable element and a second geometric phase element arranged between the geometric phase element and the camera,
    wherein the second switchable element is configured to be switched between states that alter and do not alter the polarization of the light, respectively, and
    wherein the second geometric phase element is configured to direct the first polarization of the first wavelength band of the light towards the image sensor in a first direction to define a first field of view and to direct the second polarization of the first wavelength band towards the image sensor in a second direction to define a second field of view, responsive to the states of the second switchable element, respectively.

12. The multi-spectral optical imaging device of claim 8, wherein the at least one optical element comprises a polarizer arranged to receive unpolarized light, and a retarder configured to alter a polarization of polarized light from the polarizer to provide the light to the switchable element.

13. The multi-spectral optical imaging device of claim 12, wherein the geometric phase element is configured to direct the first polarization of the first wavelength band towards the image sensor in a first direction responsive to the first state of the switchable element to define a first field of view, and to direct the second polarization of the first wavelength band toward the image sensor in second direction responsive to the second state of the switchable element to define a second field of view.

14. The multi-spectral optical imaging device of claim 13, wherein the geometric phase element is a first geometric phase element, and further comprising:
   an illumination source configured to output light emission comprising the first wavelength band in synchronization with the first and second states of the switchable element; and
   a second geometric phase element arranged to receive the light emission from the illumination source,
   wherein the second geometric phase element is configured to direct the first polarization of the first wavelength band of the light emission into a first direction to define a first field of illumination, and to direct the second polarization of the first wavelength band of the light emission into a second direction to define a second field of illumination.

15. The multi-spectral optical imaging device of claim 14, wherein:
   the first geometric phase element is arranged to receive the light from a first region of the switchable element;
   the illumination source is arranged to provide the light emission to a second region of the switchable element that is adjacent the first region; and
   the second geometric phase element is arranged to receive the light emission from the second region of the switchable element.

16. The multi-spectral optical imaging device of claim 14, wherein the switchable element is a first switchable element, and further comprising:
   a second switchable element that is arranged to receive the light emission from the illumination source and to provide the light emission to the second geometric phase element,
   wherein the second switchable element is configured to be switched between states that alter and do not alter the polarization of the light emission responsive to the first and second states of the first switchable element, respectively.

17. The multi-spectral optical imaging device of claim 16, wherein the illumination source and the camera are separated by a distance configured to provide parallax therebetween, and wherein the light emission comprises a structured light pattern.

18. The multi-spectral optical imaging device of claim 17, wherein the second geometric phase element comprises optical axis orientations that vary linearly to provide the light emission in the structured light pattern.

19. The multi-spectral optical imaging device of claim 17, wherein the at least one optical element, the switchable element, the first geometric phase element, and the camera define a first light sensor, wherein the illumination source and the second geometric phase element define a first light source, and further comprising:
   a second light sensor; and
   a second light source configured to output light emission comprising the first wavelength band in synchronization with operation of the second light sensor;
   wherein the second light source and the second light sensor are separated by the distance configured to provide parallax therebetween.

20. The multi-spectral optical imaging device of claim 14, wherein the second geometric phase element comprises optical axis orientations that vary non-linearly to provide a lens power for the light emission.

21. The multi-spectral optical imaging device of claim 1, further comprising:
   an illumination source configured to emit the light comprising the first wavelength band and arranged to provide the light to the switchable element,
   wherein the geometric phase element is configured to direct a first polarization of the first wavelength band of the light emission into a first direction to define a first field of illumination, and to direct a second polarization of the first wavelength band of the light emission into a second direction to define a second field of illumination.

22. The multi-spectral optical imaging device of claim 1, wherein the multi-spectral optical imaging device is implemented in a spectacle form factor.

23. The multi-spectral optical imaging device of claim 1, wherein the second wavelength band comprises light within a visible light spectrum, and wherein the first wavelength band comprises light outside of the visible light spectrum.

24. The multi-spectral optical imaging device of claim 23, wherein the first wavelength band comprises infrared light.

25. The multi-spectral optical imaging device of claim 1, wherein the switchable element and the geometric phase element comprise optical films that are stacked to define a monolithic structure.

26. An optical shutter, comprising:
   a first reflective Bragg polarization grating;
   a liquid crystal layer on the first reflective Bragg polarization grating; and
   a second reflective Bragg polarization grating on the liquid crystal layer,
   wherein the liquid crystal layer is configured to be switched between first and second states, wherein one of the first and second states alters a polarization of light, and
   wherein the first and second reflective Bragg polarization gratings are respectively configured to diffract a first polarization of a first wavelength band of the light into a reflective first-order direction and to transmit a second polarization of the first wavelength band of the light into a zero-order direction without substantially altering a direction of propagation of a second wavelength band of the light.

27. The optical shutter of claim 26, wherein the first and second reflective Bragg polarization gratings are respectively configured to transmit the second wavelength band of the light independent of the first and second states of the liquid crystal layer.

28. The optical shutter of claim 27, wherein the second reflective Bragg polarization grating is configured to diffract the first polarization of the first wavelength band responsive to the first state of the liquid crystal layer, and is configured to transmit the second polarization of the first wavelength band responsive to the second state of the liquid crystal layer.

29. The optical shutter of claim 28, wherein the first polarization is orthogonal to the second polarization, and wherein the first reflective Bragg polarization grating is configured to provide the light to the liquid crystal layer such that the first wavelength band of the light comprises the second polarization and is substantially free of the first polarization.

30. The optical shutter of claim 29, wherein the first and second polarizations comprise circular polarizations of opposite handedness.

31. The optical shutter of claim 26, wherein the second wavelength band comprises light within a visible light spectrum, and wherein the first wavelength band comprises light within an infrared spectrum.

32. A multi-spectral optical imaging detector, comprising:
a camera comprising an image sensor that is configured to detect first and second wavelength bands of light; and
an optical shutter comprising a switchable liquid crystal layer and a geometric phase element configured to selectively transmit or diffract the first wavelength band of the light towards or away from the image sensor, respectively, based on a polarization thereof, and to transmit the second wavelength band of the light to the image sensor independent of the polarization thereof.

33. The multi-spectral optical imaging detector of claim 32, wherein the switchable liquid crystal layer configured to be switched between first and second states to output orthogonal first and second polarizations of the light, respectively, and
wherein, responsive to the first state of the switchable liquid crystal layer, the geometric phase element is configured to diffract the first polarization of the first wavelength band of the light away from the image sensor, and
wherein, responsive to the second state of the switchable liquid crystal layer, the geometric phase element is configured to simultaneously transmit the second wavelength band and the second polarization of the first wavelength band of the light to the image sensor.

34. The multi-spectral optical imaging detector of claim 33, wherein the image sensor is configured to capture coincident first and second image data responsive to the first and second states of the switchable liquid crystal layer, respectively, and wherein calculation of image data for the first wavelength band of the light is based on subtraction of the first and second image data.

35. The multi-spectral optical imaging detector of claim 33, wherein the image sensor is configured to capture coincident second and third image data responsive to activation and deactivation, respectively, of an illumination source providing light emission comprising the first wavelength band of the light during sequential operations of the switchable liquid crystal layer in the second state, and wherein calculation of image data for the first wavelength band of the light is based on subtraction of the second and third image data.

36. The multi-spectral optical imaging detector of claim 33, wherein the geometric phase element comprises a second reflective Bragg polarization grating, the optical shutter further comprises a first reflective Bragg polarization grating, and the switchable liquid crystal layer is between the first and second reflective Bragg polarization gratings,
wherein the first and second reflective Bragg polarization gratings are respectively configured to diffract the first polarization of the first wavelength band of the light into a reflective first-order direction and to transmit the second polarization of the first wavelength band of the light into a zero-order direction.

* * * * *